US008594405B2

(12) United States Patent
Nakagawa et al.

(10) Patent No.: US 8,594,405 B2
(45) Date of Patent: Nov. 26, 2013

(54) THREE-DIMENSIONAL TEMPLATE TRANSFORMATION METHOD AND APPARATUS

(75) Inventors: Machiko Nakagawa, Kawasaki (JP); Toshiaki Hisada, Tokyo (JP); Seiryo Sugiura, Tokyo (JP); Takumi Washio, Tokyo (JP); Jun-ichi Okada, Tokyo (JP); Yoshimasa Kadooka, Kawasaki (JP)

(73) Assignees: Fujitsu Limited, Kawasaki (JP); The University of Tokyo, Tokyo (JP)

(*) Notice: Subject to any disclaimer, the term of this patent is extended or adjusted under 35 U.S.C. 154(b) by 344 days.

(21) Appl. No.: 13/052,252

(22) Filed: Mar. 21, 2011

(65) Prior Publication Data
US 2011/0235883 A1 Sep. 29, 2011

(30) Foreign Application Priority Data

Mar. 26, 2010 (JP) ................................ 2010-072258

(51) Int. Cl.
*G06K 9/00* (2006.01)
(52) U.S. Cl.
USPC ......................................................... 382/131
(58) Field of Classification Search
USPC .................. 382/128, 131, 209, 215, 217; 250/363.02, 363.04; 378/4, 21, 62, 165
See application file for complete search history.

(56) References Cited

U.S. PATENT DOCUMENTS

| 5,889,524 | A | * | 3/1999 | Sheehan et al. | 345/419 |
| 6,226,418 | B1 | | 5/2001 | Miller et al. | |
| 7,773,785 | B2 | * | 8/2010 | Murphy et al. | 382/128 |
| 8,326,086 | B2 | * | 12/2012 | Carlsen et al. | 382/294 |
| 8,406,496 | B2 | * | 3/2013 | Zheng et al. | 382/131 |

FOREIGN PATENT DOCUMENTS

| JP | 2001-101441 | 4/2001 |
| JP | 2003-208626 | 7/2003 |
| JP | 2006-072933 | 3/2006 |

OTHER PUBLICATIONS

Fred L. Bookstein, "Principal Warps: Thin-Plate Splines and the Decomposition of Deformations," Jun. 1989, pp. 567-585.

\* cited by examiner

*Primary Examiner* — Shervin Nakhjavan
(74) *Attorney, Agent, or Firm* — Staas & Halsey LLP

(57) ABSTRACT

A method includes: obtaining designated 3D template for a designated part in a heart; generating 3D annulus data representing an annulus of a heart valve identified as a reference of transformation, from a cross-section image in a plane passing through an axis within the annulus of the identified heart valve in 3D volume data generated from tomographic images; identifying a first point on the annulus of the identified heart valve in the designated 3D template and a second point on the annulus represented by the 3D annulus data; arranging n starting points from the first point on the annulus of the identified heart valve in the designated 3D template and n target points from the second point on the annulus represented by the 3D annulus data; and calculating movement destination coordinates of vertices of polygons relating to the designated 3D template to transform the designated 3D template.

11 Claims, 36 Drawing Sheets

STRUCTURAL SECTION
(HEART MUSCLES)
FLUID SECTION
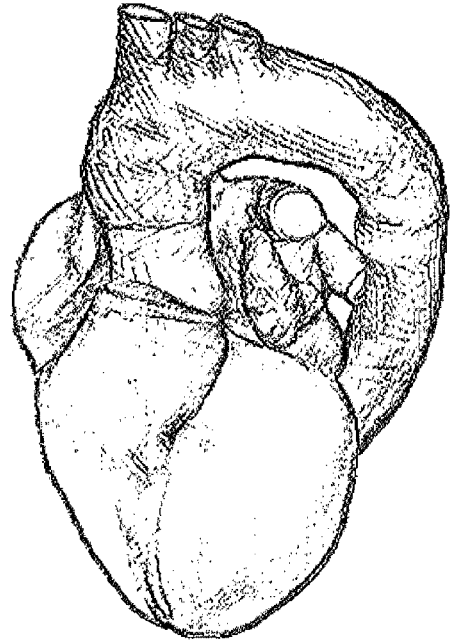 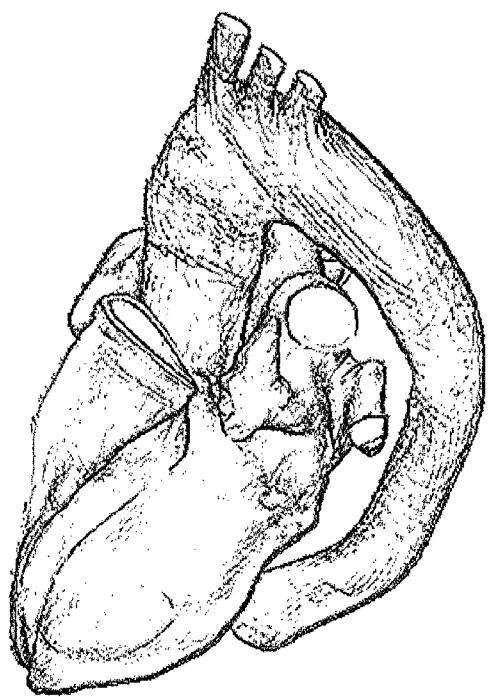
FIG.3
EXAMPLE OF TEMPLATE DATA
STRUCTURE
DATA TYPE: Triangle
NO. OF VERTEXES: n
NO. OF CELLS: m
VERTEX COORDINATES: P[n][3]
CELL STRUCTURE: C[m][3]
VERTEX DATA: double[n][3] Vector
ELEMENT DATA: double[m] Scalar
              int Label
FIG.4

| PART | BOUNDARY |
|---|---|
| AORTA | AORTIC VALVE ANNULUS, CORONARY ARTERY, BRACHIOCEPHALIC ARTERY, LEFT COMMON CAROTID ARTERY, LEFT SUBCLAVIAN ARTERY, END SECTION OF DESCENDING AORTA |
| LEFT VENTRICLE | AORTIC VALVE ANNULUS, MITRAL VALVE ANNULUS, HEART APEX |
| LEFT ATRIUM | MITRAL VALVE ANNULUS, PULMONARY VEIN |
| RIGHT ATRIUM | TRICUSPID VALVE ANNULUS, SUPERIOR AND INFERIOR VENA CAVA |
| RIGHT VENTRICLE | PULMONARY VALVE ANNULUS, TRICUSPID VALVE ANNULUS |

FIG.10

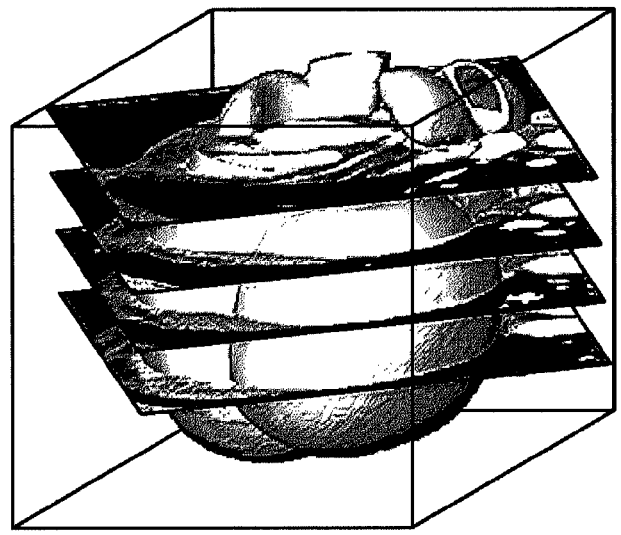
FIG.15
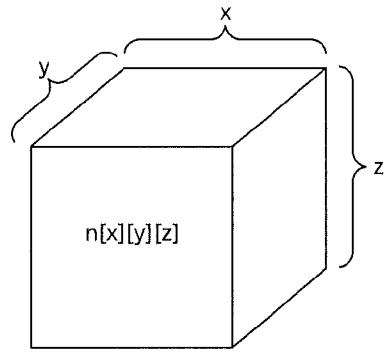
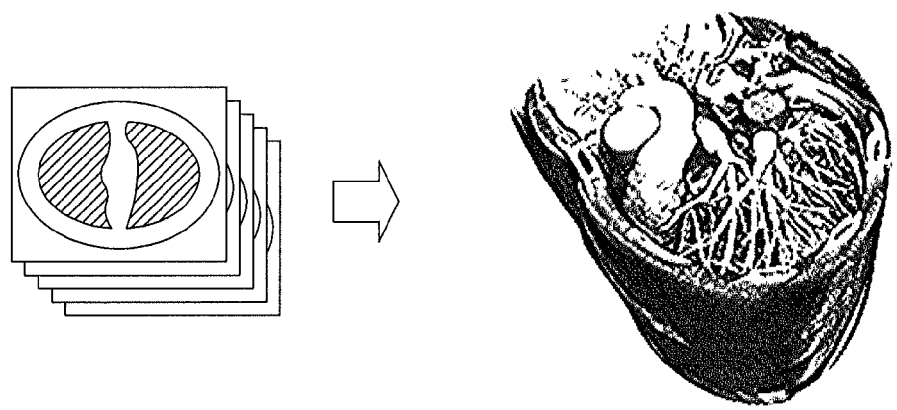
FIG.18

LINE DATA
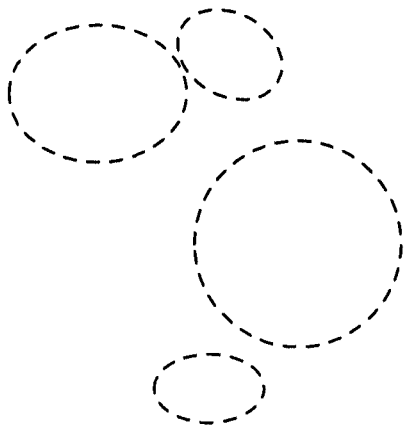
TEMPLATE DATA
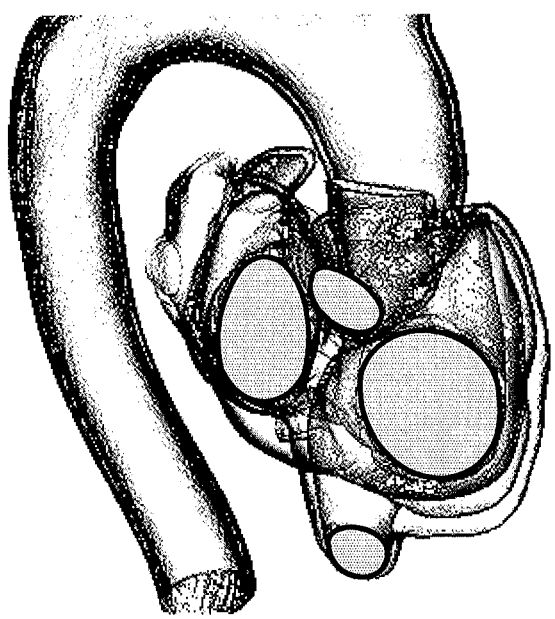
FIG.28

THREE-DIMENSIONAL TEMPLATE TRANSFORMATION METHOD AND APPARATUS

CROSS-REFERENCE TO RELATED APPLICATIONS

This application is based upon and claims the benefit of priority of the prior Japanese Patent Application No. 2010-072258, filed on Mar. 26, 2010, the entire contents of which are incorporated herein by reference.

FIELD

This technique relates to a transformation technique of a three-dimensional (3D) template including the heart and blood vessels surrounding the heart.

BACKGROUND

In recent years, 3D geometric models of the heart are used in education, simulation and the like. For example, grasping the three dimensional shape from a collection of tomographic images such as Computed Tomography (CT) images or Magnetic Resonance Imaging (MRI) images requires much experience and knowledge, however, by generating and displaying a 3D geometric model, it becomes possible for even a person with little medical knowledge to intuitively recognize the shape of the heart.

Incidentally, there are the following kinds of methods for generating a 3D geometric model of the heart. For example, as illustrated in FIG. 1, first, a physician draws boundary lines of the inner wall section of the heart muscle, the outer wall section of the heart muscle, blood vessels and the like on several hundred tomographic images, and specifies the respective parts' names. After that, the physician looks at the 3D shape according to information concerning the boundary lines and parts, gives instructions for corrections, and forms the 3D geometric model according to the correction instructions. As necessary, the physician divides the formed 3D geometric model into polygons. Incidentally, there are a lot of variations among patients for the heart position and angle and the ratio of the heart ventricles and heart atrium, and there are also differences depending on the clinical condition of a patient. Therefore, it is necessary to generate a 3D geometric model for each patient, which is close to the actual heart shape of the patient.

However, the heart is surrounded by many blood vessels, surrounding organs, bone and the like, and has a complex structure of heart muscles having different thicknesses depending on the part. In addition to those problems, there are also differences among individuals. Therefore, grasping the 3D positional information from tomographic images requires experience and knowledge in anatomy. Moreover, there are also cases in which it is difficult to distinguish boundaries due to unevenness in contrast dye or surgical scars. Therefore, except for a skilled physician, it is difficult to identify boundaries of the heart muscles, blood vessels and the like from tomographic images.

As described above, in conventional methods, in order to generate a 3D geometric model of the patient's heart, a physician having knowledge had to draw boundary lines on several hundred tomographic images. Therefore, a lot of works as well as knowledge are required.

SUMMARY

A three-dimensional template transformation method executed by a computer, comprising: accepting designation of a part for which a three-dimensional geometric model is generated, among a heart and blood vessels surrounding the heart to obtain a three-dimensional template for a designated part from a template storage unit storing three-dimensional templates represented by polygons; first identifying a heart valve that is a reference in transformation of the three-dimensional template for the designated part; extracting a shape of an annulus of the identified heart valve from a cross-section image in a plane passing through an axis within the annulus of the identified heart valve in a three-dimensional volume data, which is generated from a plurality of tomographic images of an organism including the heart, the plurality of tomographic images being stored in a tomographic image storage unit, and storing a three-dimensional annulus data representing the annulus of the identified heart valve into a storage device; second identifying a first reference point that is a point satisfying a first condition on the annulus of the identified heart valve in the three-dimensional template for the designated part, and identifying a second reference point that is a point satisfying the first condition on the annulus represented by the three-dimensional annulus data stored in the storage device and corresponding to the first reference point; arranging, according to a predetermined rule, n starting points from the first reference point on the annulus of the identified heart valve in the three-dimensional template for the designated part, arranging, according to the predetermined rule, n target points from the second reference point on the annulus represented by the three-dimensional annulus data stored in the storage device, and storing coordinates of the starting points and the target points into the storage device, wherein the n is a predetermined integer; first calculating coefficients of a predetermined function to calculate movement destination coordinates of vertices of the polygons relating to the three-dimensional template for the designated part, by using the coordinates of the starting points and the target points, which are stored in the storage device; and second calculating the movement destination coordinates of the vertices of the polygons relating to the three-dimensional template for the designated part, by using the calculated coefficients and the predetermined function, transforming the three-dimensional template for the designated part according to the calculated movement destination coordinates, and storing the transformed three-dimensional template as a three-dimensional geometric model of the designated part into the storage device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram depicting an example of a 3D template;

FIG. 4 is a diagram depicting data structure of the 3D template;

FIG. 10 is a diagram depicting an example of data stored in a reference part data storage unit;

FIG. 15 is a diagram depicting tomographic images and 3D template;

FIG. 17 is a diagram depicting data included in the 3D template for the ventricle section, atrium section, aorta or the like;

FIG. 18 is a diagram depicting an example of 3D volume data;

FIG. 28 is a diagram depicting examples of the line data and template data in a reference part;

DESCRIPTION OF EMBODIMENTS

Figure 1:
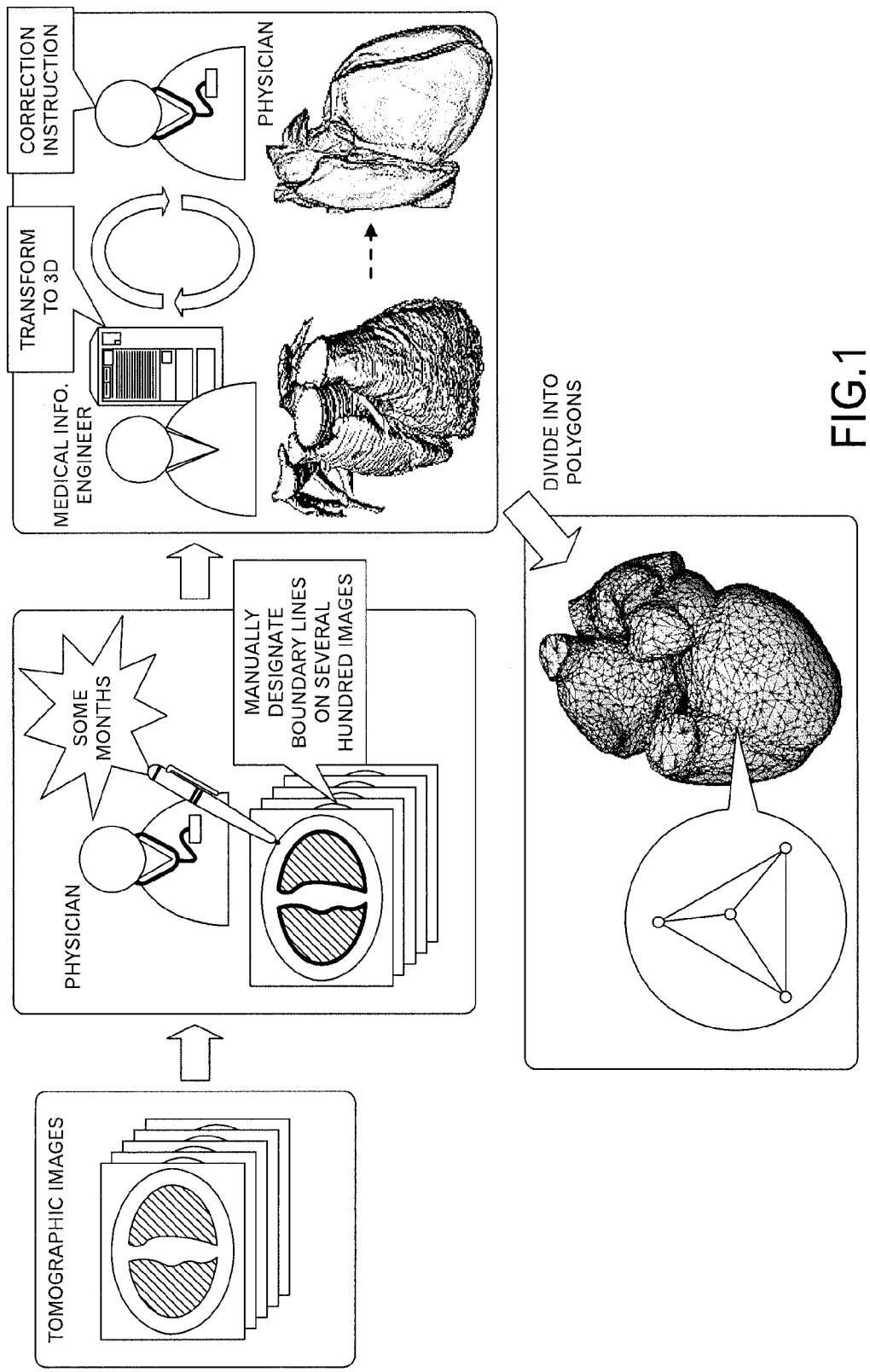
FIG. 1 is a diagram depicting a flow of a conventional method.
Figure 2:
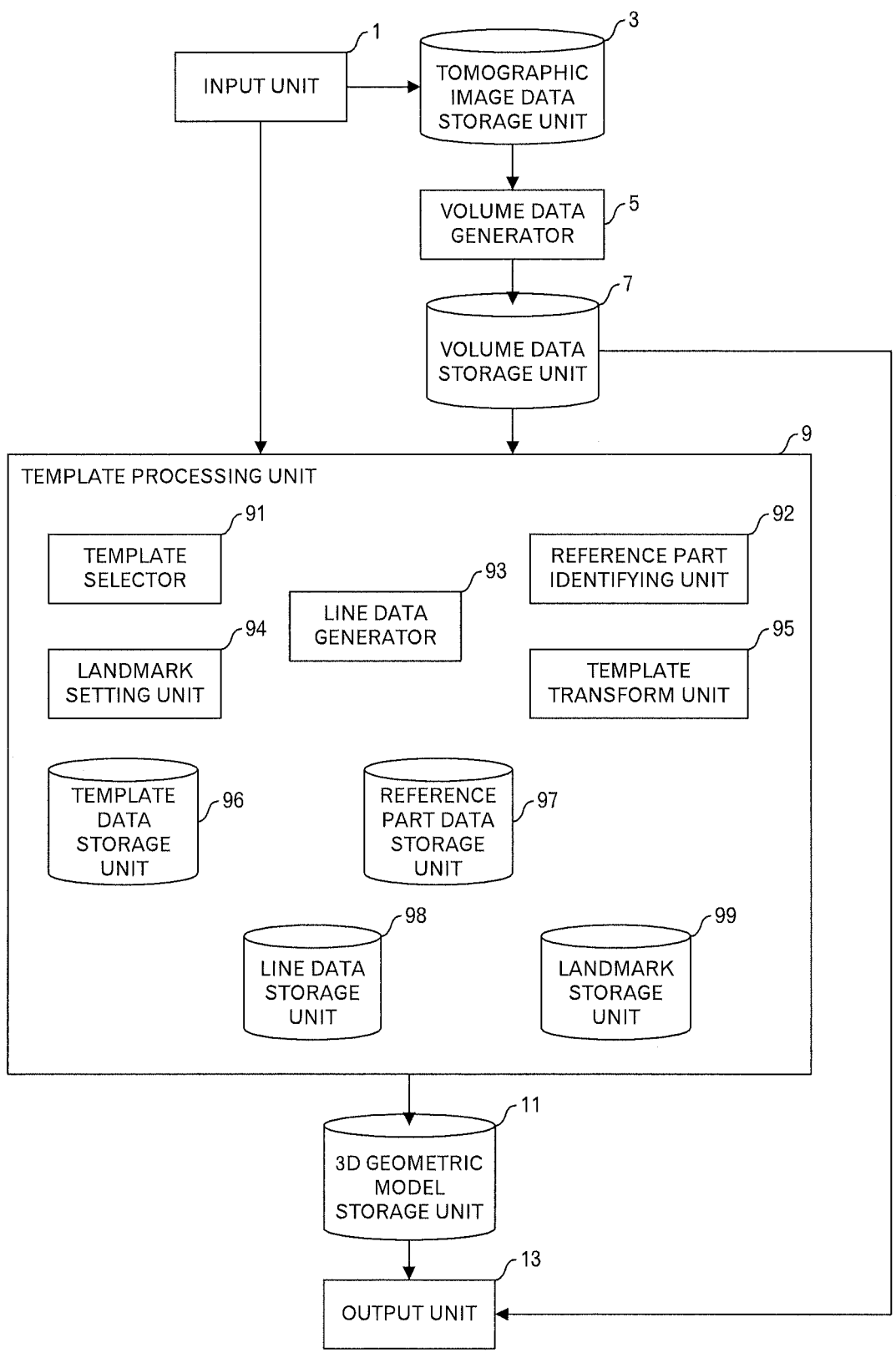
FIG. 2 is a functional block diagram of a three-dimensional template transformation apparatus relating to this embodiment.

FIG. 2 illustrates a functional block diagram of a 3D template transformation apparatus relating to an embodiment of this technique. The 3D template transformation apparatus relating to this embodiment has an input unit 1; tomographic image data storage unit 3; volume data generator 5; volume data storage unit 7; template processing unit 9; 3D geometric model storage unit 11; and output unit 13.

The input unit 1 receives tomographic images (for example, CT images, MRI images and the like) of a body including the heart from an imaging apparatus (not illustrated in the figure) and stores those images into the tomographic image data storage unit 3, and receives, from a user, designation of one or more parts, for which the 3D geometric model will be generated, and gives an instruction to the template processing unit 9 to start the processing. Incidentally, there are cases in which the tomographic image data storage unit 3 is included in an imaging apparatus connected via a network or another computer, and in such cases, the 3D template transformation apparatus acquires tomographic images from that image apparatus or another computer, if necessary.

The volume data generator 5 uses the data stored in the tomographic image data storage unit 3 to generate 3D volume data, and stores the generated data into the volume data storage unit 7. The output unit 13 displays the data that are stored in the volume data storage unit 7 and 3D geometric model storage unit 11 on a display or the like.

The template processing unit 9 includes a template selector 91; reference part identifying unit 92; line data generator 93; landmark setting unit 94; template transform unit 95; template data storage unit 96; reference part data storage unit 97; line data storage unit 98 and a landmark storage unit 99. After receiving an instruction from the input unit 1 to start the processing, the template processing unit 9 uses the 3D volume data that are stored in the volume data storage unit 7, and the data that are stored in the template data storage unit 96 and reference part data storage unit 97 to carry out a processing (described in detail later) to generate a 3D geometric model, and stores the generated 3D geometric model into the 3D geometric model storage unit 11.

The template data storage unit 96 stores 3D templates that include the heart and blood vessels surrounding the heart and are formed using polygons. For example, as illustrated in FIG. 3, data that represents the structural sections representing thick heart muscles, and data that represents the fluid sections representing fluid within the inner wall section of the heart muscle are stored as 3D templates. Incidentally, the shape of the heart differs among individuals, and also differs depending on the clinical state. Therefore, in this embodiment, several typical 3D templates are prepared. For example, a user is caused to input selection conditions such as gender, age, medical history (stent treatment, cardiac ventricle reduction surgery, or the like) that has had an effect on the heart or heart blood vessels and ailment (swelling of the heart, aneurism, heart valve disease, and the like), and a 3D template that matches with or is the closest to the inputted selection conditions is used for the processing.

Moreover, FIG. 4 illustrates an example of a data structure of 3D template data that is stored in the template data storage unit 96. In the example of FIG. 4, the 3D template is managed by the data structure that includes the data type, the number of vertices, the number of cells, vertex coordinates, cell structure, vertex data, and element data. In some cases, data such as label information that represents which part it is may be stored. Incidentally, as long as the data structure can manage polygon data, it is also possible to use other data structure.

Figure 5:
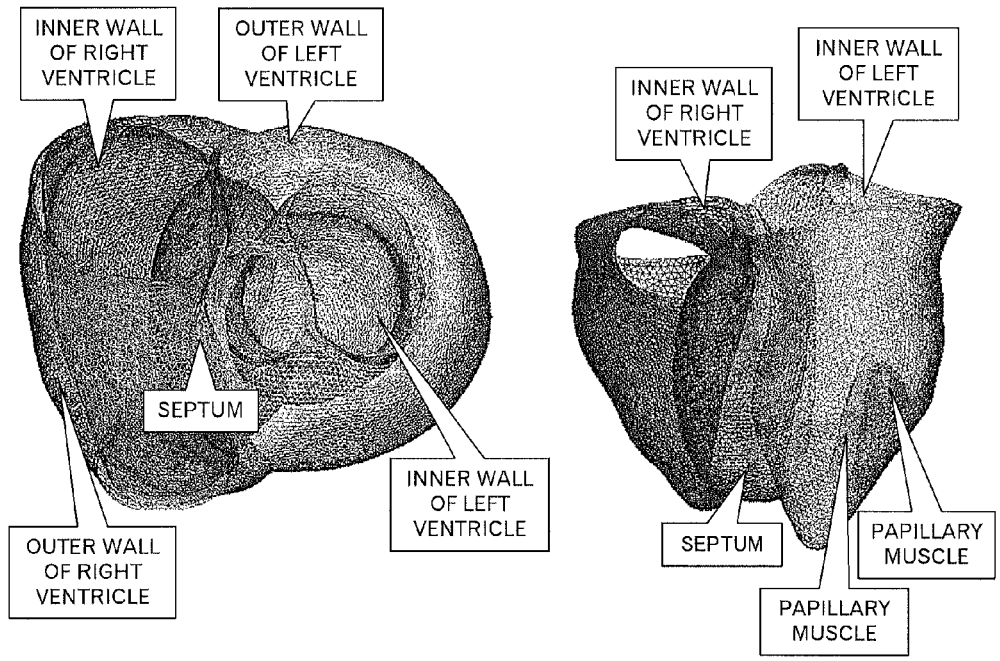
FIG. 5 is a diagram depicting an example of the 3D template for a ventricle section.
Figure 6:
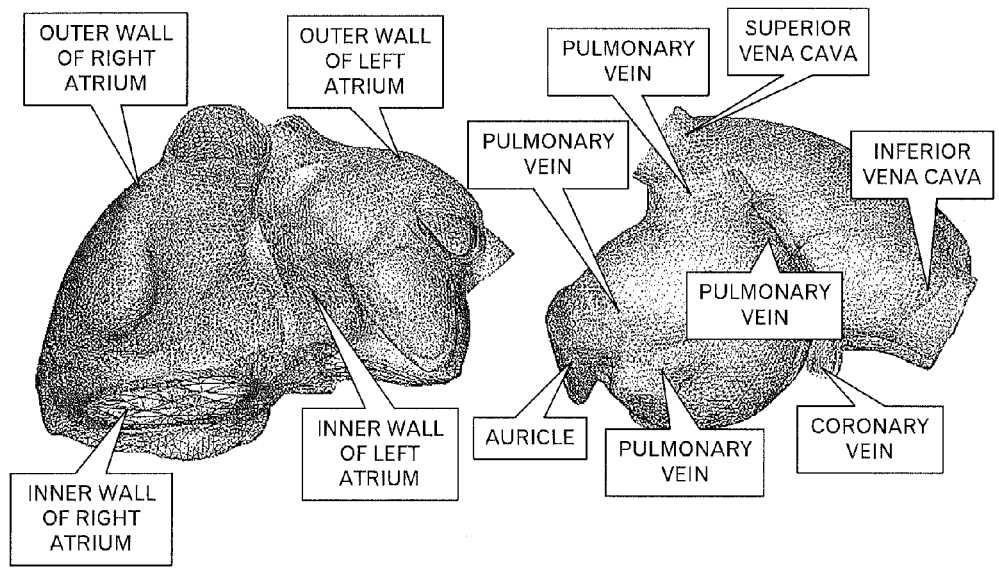
FIG. 6 is a diagram depicting an example of the 3D template for a atrium section.
Figure 7:
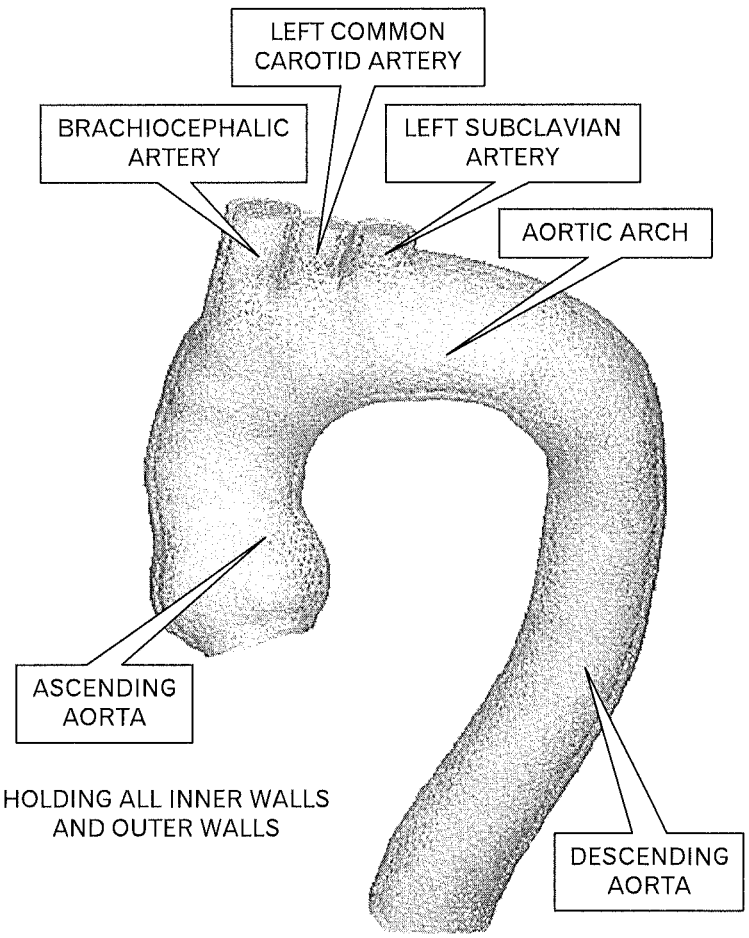
FIG. 7 is a diagram depicting an example of the 3D template for an aorta.
Figure 8:
FIG. 8 is a diagram depicting an example of the 3D template for a coronary artery and coronary vein.
Figure 9:
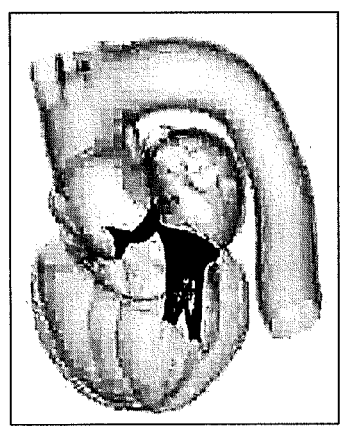
FIG. 9 is a diagram depicting an example of the 3D template for a heart valve.

FIG. 5 to FIG. 9 illustrate examples of 3D templates of the ventricle section, atrium section, surrounding blood vessels such as the aorta and coronary artery, and heart valves. FIG. 5 illustrates an example of a 3D template of the ventricle section, with the respective outer wall and inner wall of the right ventricle and left ventricle, septum between the right ventricle and left ventricle and papillary muscle in the left ventricle being represented. FIG. 6 illustrates an example of a 3D template for the atrium section, with the respective outer wall and inner wall of the right atrium and left atrium, superior vena cava, inferior vena cava, pulmonary vein, coronary vein and auricle being represented. Furthermore, FIG. 7 illustrates an example of a 3D template of the aorta, with the ascending aorta, aortic arch, descending aorta, brachiocephalic artery, left common carotid artery and left subclavian artery being represented. FIG. 8 illustrates an example of a 3D template of the coronary artery and coronary vein. Furthermore, FIG. 9 illustrates an example of a template of the heart valves, with the dark-filled sections representing the heart valves.

Figure 11:
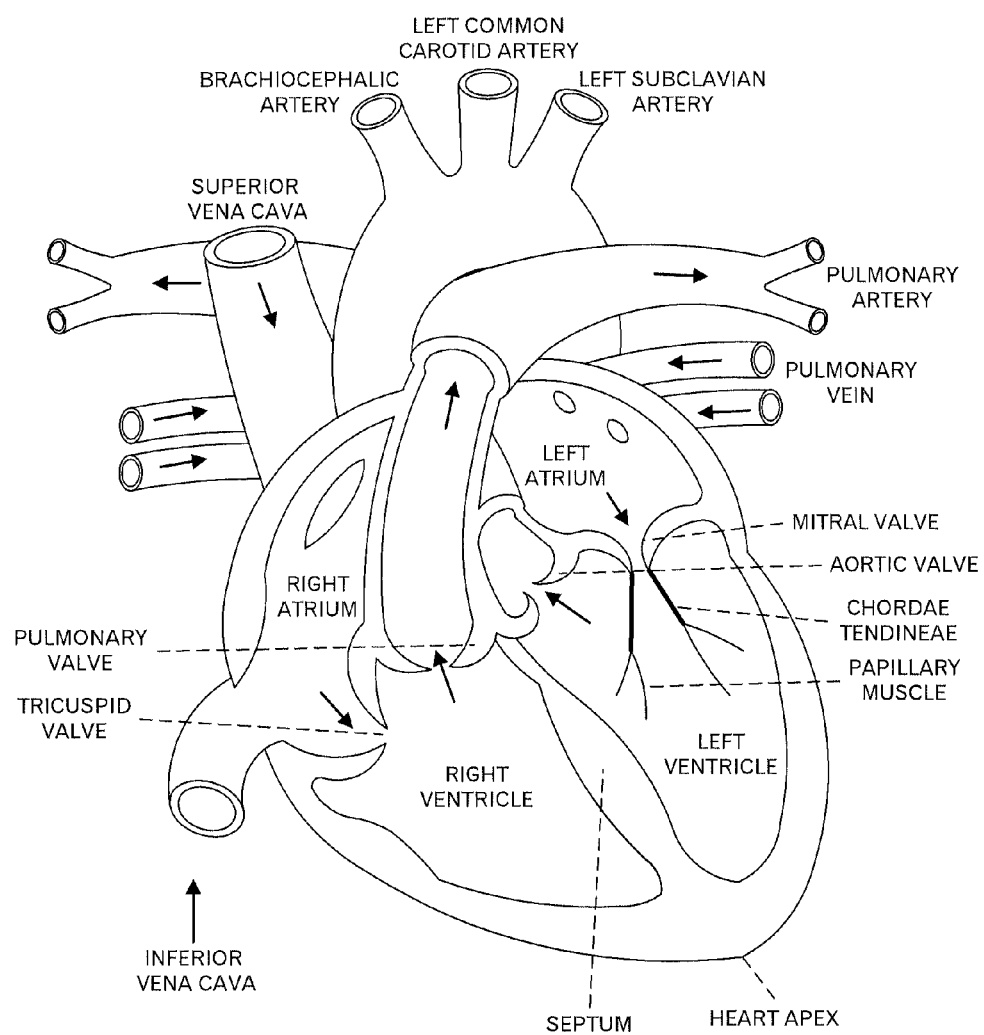
FIG. 11 is a diagram schematically depicting the inside of the heart and blood vessel surrounding the heart.

Data as illustrated in FIG. 10 is stored in the reference part data storage unit 97 in advance. In the example of FIG. 10, part and boundary information that becomes a reference in 3D template transformation is stored in the reference part data storage unit 97 for each part for which the model is generated. For example, in the case of the aorta, the boundaries between the aorta and each of the aortic valve annulus, coronary artery, brachiocephalic artery, left common carotid artery and left subclavian artery, and the shape of the end section of the descending aorta become a reference. In the case of the left ventricle, the aortic valve annulus, mitral valve annulus and heart apex become a reference. In the case of the left atrium, the mitral valve annulus and boundary between the left atrium and pulmonary vein become a reference. In the case of the right atrium, the tricuspid valve annulus and boundary between the right atrium and the superior and inferior vena cava become a reference. In the case of the right ventricle, the pulmonary valve annulus and tricuspid valve annulus become a reference. Incidentally, the positions of the respective heart valves and respective blood vessels are as illustrated in FIG. 11. FIG. 11 schematically illustrates the inside of the heart and the blood vessels surrounding the heart, with the parts of the heart being illustrated as a cross section such that the internal structure is easy to understand. Moreover, the arrows in FIG. 11 illustrate the direction of the blood flow. In this embodiment, there are cases in which, among the parts and boundaries that are references in 3D template transformation, boundaries other than the heart valve annulus and heart apex may be called blood vessel boundaries.

Figure 12:
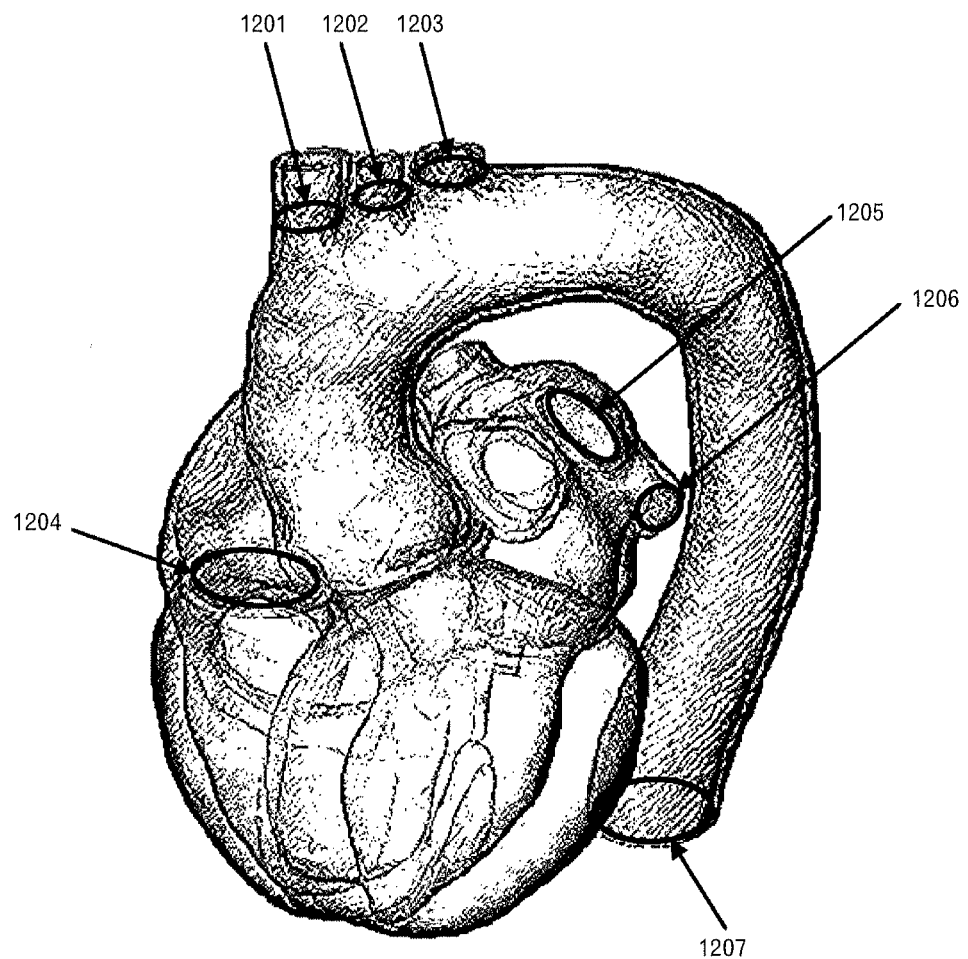
FIG. 12 is a diagram depicting an example when viewing the 3D template from a certain direction.
Figure 13:
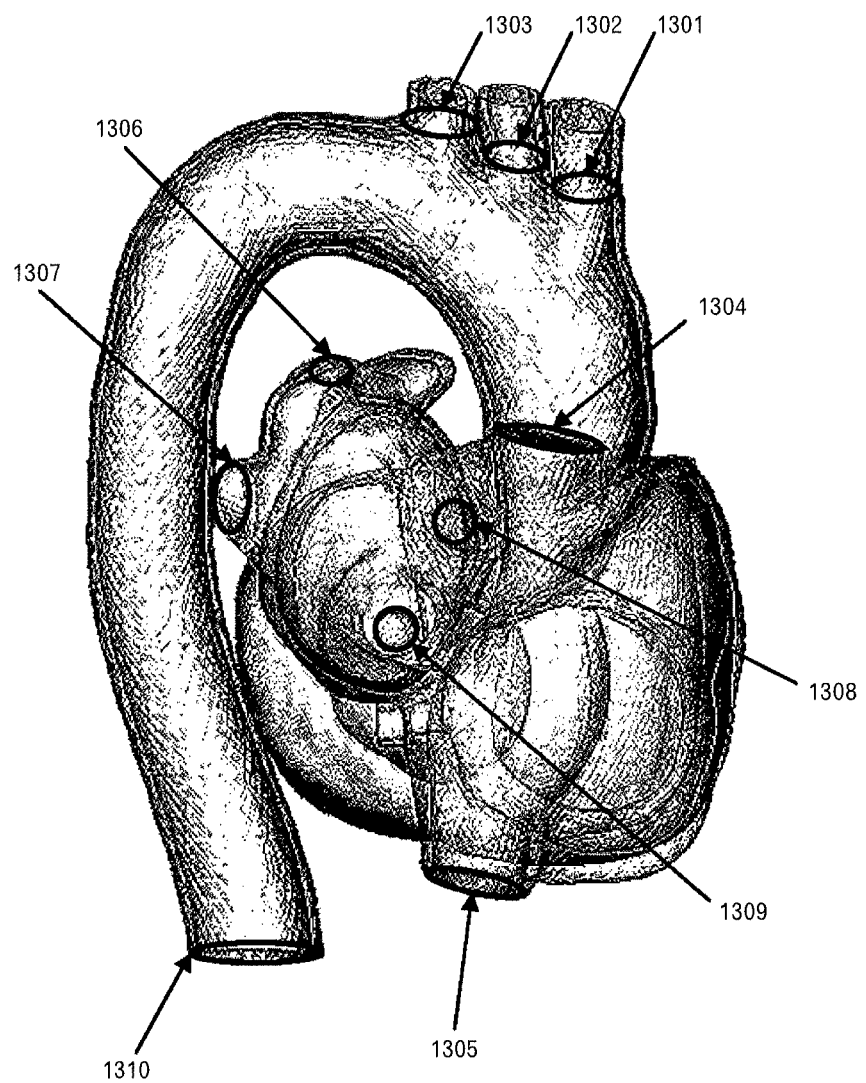
FIG. 13 is a diagram depicting an example when viewing the 3D template from a direction different from FIG. 12.

For example, FIG. 12 and FIG. 13 illustrate examples where a 3D template is viewed from different directions. In FIG. 12, the ellipse 1201 represents the boundary between the brachiocephalic artery and the aorta. In addition, the ellipse 1202 represents the boundary between the left common carotid artery and the aorta. Moreover, the ellipse 1203 represents the boundary between the left subclavian artery and the aorta. Furthermore, the ellipse 1204 represents the boundary between the right atrium and the superior vena cava. Still Further, the ellipses 1205 and 1206 respectively represent the boundary between the left atrium and the pulmonary vein. Moreover, the ellipse 1207 represents the shape of the end section of the descending aorta.

On the other hand, in FIG. 13, the ellipse 1301 represents the boundary between the brachiocephalic artery and the aorta, and the ellipse 1302 represents the boundary between the left common carotid artery and the aorta. Moreover, the ellipse 1303 represents the boundary between the left subclavian artery and the aorta. In addition, the ellipse 1304 represents the boundary between the right atrium and the superior vena cava. Furthermore, the ellipse 1305 represents the boundary between the right atrium and the inferior vena cava. In addition, the ellipses 1306 to 1309 respectively represent the boundary between the left atrium and the pulmonary vein. Moreover, the ellipse 1310 represents the shape of the end section of the descending aorta.

Next, the operation of the 3D template transformation apparatus will be explained using FIG. 14 to FIG. 42. Before explaining the detailed processing flow, the overall flow will be explained using FIG. 14. First, in step (1), the 3D template to be used this time is selected. For example, the user inputs the gender, age, medical history, ailment and the part for which the 3D geometric model is generated. The 3D templates that match with or are closest to the input gender, age, medical history and ailment are identified, and the 3D template of the part for which the 3D template is generated is selected among the identified templates as the 3D template to be used this time. For example, when only the ventricle section is designated as the part for which the 3D geometric model is generated, a 3D template such as illustrated in FIG. 5 is selected. Moreover, when only the atrium section is designated as the part for which the 3D geometric model is generated, a 3D template such as illustrated in FIG. 6 is selected. Furthermore, when only the aorta is designated as the part for which the 3D geometric model is generated, a 3D template such as illustrated in FIG. 7 is selected.

Next, in step (2), 3D volume data is generated from plural tomographic images. In step (3), rough position alignment is performed. More specifically, using the selected 3D template and the generated 3D volume data, the 3D template is transformed so that it is aligned as illustrated in FIG. 15 in order that the heart shape matches with its rough position.

In step (4), detailed shape settings are performed. More specifically, as for a certain plane, the cross-sectional image of the transformed 3D template and cross-sectional image of the 3D volume data are displayed, and the user is caused to designate pairs of a starting point and target point. The 3D template is then further transformed according to the designated pairs of the starting point and target point. If necessary, this processing is repeated for various planes. Thus, the 3D template is transformed to make it possible to generate a 3D geometric model. The detailed processing flow will be explained below.

The processing flow for the steps (1) to (3) illustrated in FIG. 14 will be explained in detail using FIG. 16 to FIG. 34. As a presumption, it is presumed that plural tomographic images of the patient have been taken and are stored in the tomographic image data storage unit 3. Furthermore, it is presumed that plural representative templates are stored in the template data storage unit 96, and data such as illustrated in FIG. 10 are stored in the reference part data storage unit 97.

First, a user, such as a physician, operates the mouse and/or keyboard to input template selection conditions on a template condition input screen (not illustrated in the figure) that is displayed on a display device. The template selection conditions include, for example, the patient ID, gender, age, medical history, ailment and parts (ventricles, atriums, aorta, heart valves, coronary arteries, coronary veins, etc.) for which the 3D geometric model is generated. Then, the input unit 1 receives the template selection conditions that were inputted by the user (FIG. 16: step S1), and stores the inputted conditions into a storage device, temporarily. When the 3D template transformation apparatus is connected to an electronic medical records system, information such as the patient's gender, age, medical history and ailment may be acquired from the electronic medical records system based on the patient ID.

Then, the template selector 91 of the template processing unit 9 selects the 3D template to be used from among the 3D templates stored in the template data storage unit 96 according to the selection conditions stored in the storage device (step S3). More specifically, the template selector 91 identifies 3D templates that match with or are the closest to those conditions, according to the gender, age, medical history and ailment, from the template data storage unit 96, and selects a 3D template of the part, for which the 3D geometric model is generated, among the identified templates, as the 3D template to be used this time. The template selector 91 acquires data of the selected 3D template from the template data storage unit 96, and uses this template in the following processing.

Figure 17:
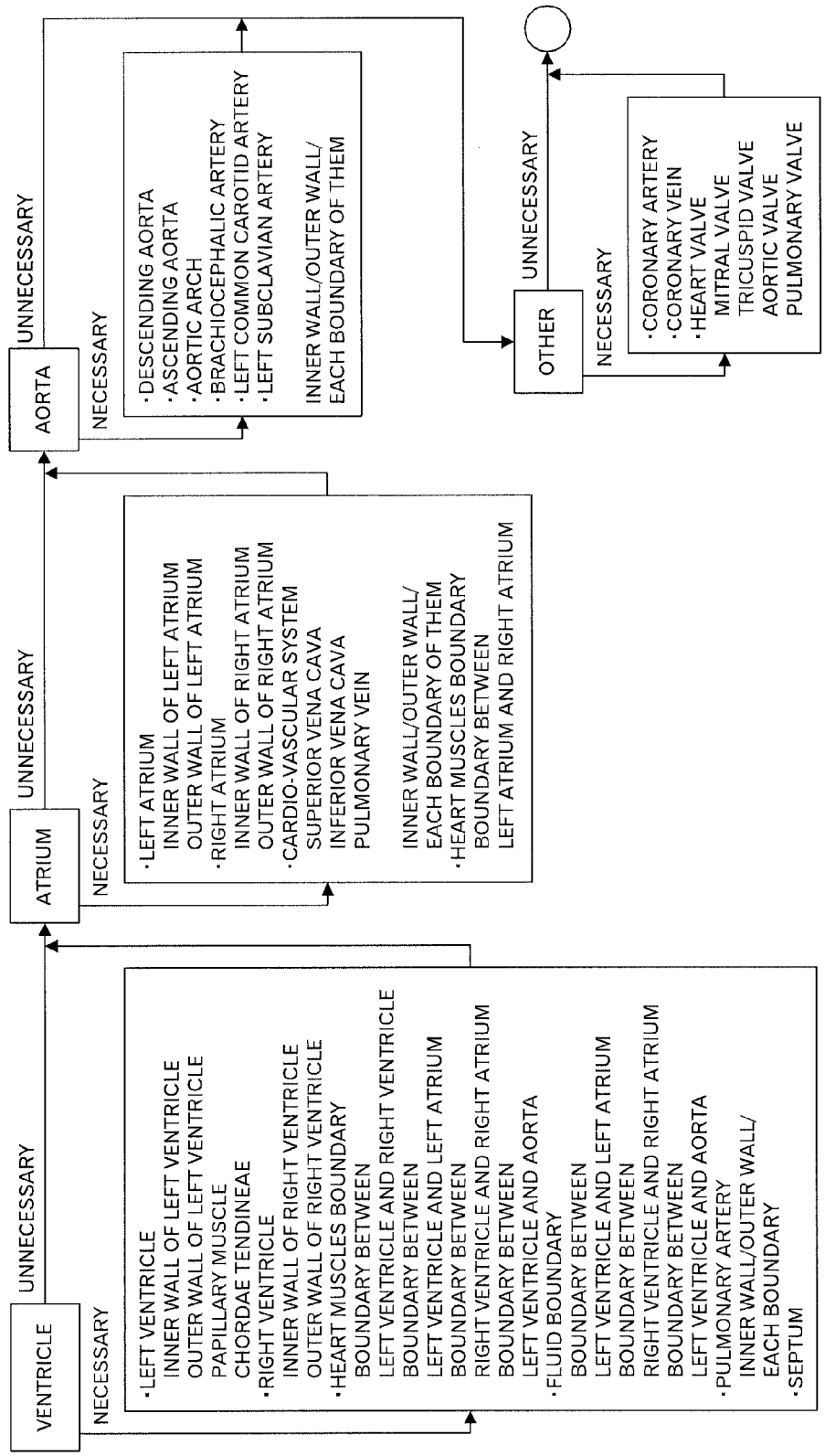

For example, as illustrated in FIG. 17, the 3D templates of the ventricle section include data that represents the left ventricle (inner wall and outer wall of the left ventricle, papillary muscle and chordae tendineae), the right ventricle (inner wall and outer wall of the right ventricle), the heart muscles boundaries (boundary between the left ventricle and right ventricle, boundary between the left ventricle and left atrium, boundary between the right ventricle and right atrium and boundary between the left ventricle and aorta), fluid boundaries (boundary between the left ventricle and left atrium, boundary between the right ventricle and right atrium and boundary between the left ventricle and aorta boundary), the pulmonary artery (inner wall, outer wall and respective boundaries) and septum. In addition, the 3D templates for the atrium section include data that represents the left atrium (inner wall and outer wall of the left atrium), right atrium (inner wall and output wall of the right atrium), cardio-vascular system (inner walls, output walls of the superior vena cava, inferior vena cava, pulmonary vein and respective boundaries of them) and heart muscles boundary (boundary between the left atrium and right atrium). Furthermore, 3D templates for the aorta section include data that represents the descending aorta (inner wall, outer wall and respective boundaries), ascending aorta (inner wall, outer wall and respective boundaries), the aortic arch (inner wall, outer wall and respective boundaries), brachiocephalic artery (inner wall, outer wall and respective boundaries), left common carotid artery (inner wall, outer wall and respective boundaries) and left subclavian artery (inner wall, outer wall and respective boundaries). In addition to this, when the coronary arteries, coronary veins and heart valves (mitral valve, tricuspid valve, aortic valve and pulmonary valve) are designated as the parts for which the 3D geometric model is generated, these 3D templates are used.

Then, the volume data generator 5 generates 3D volume data from the tomographic images that are stored in the tomographic image data storage unit 3, and stores the generated data into the volume data storage unit 7 (step S5). For example, the volume data generator 5 generates 3D volume data using techniques such as linear interpolation or polynomial interpolation. FIG. 18 illustrates an example of 3D volume data that is generated from tomographic images. The method for generating 3D volume data is a well-known technique. Therefore, further explanation is omitted here. Moreover, the processing of the steps S3 and S5 may be carried out in parallel, or may be carried out in reverse order.

Then, the reference part identifying unit 92 of the template processing unit 9 searches the reference part data storage unit 97 based on the information about the part for which the 3D geometric model is generated, and which is stored in the storage device, and identifies the parts (i.e. boundaries) that will be the reference when transforming the 3D template that was selected at the step S3 as the reference parts (step S7). For example, when the ventricles (left ventricle and right ventricle) are included in the parts for which the 3D geometric model is generated, the aortic annulus, mitral annulus, heart apex, pulmonary valve annulus and tricuspid valve annulus are identified from the reference part data storage unit 97 (FIG. 10) as the reference parts. When the atriums (left atrium and right atrium) are included in the parts for which the 3D geometric model is generated, the mitral valve annulus, boundary between the left atrium and pulmonary vein, the tricuspid valve annulus and the boundary between the right atrium and superior and inferior vena cava are identified from the reference part data storage unit 97 as reference parts. Furthermore, when the aorta is included in the parts for which the 3D geometric model is generated, the aortic valve annulus and the boundaries between the aorta and each of the coronary artery, the brachiocephalic artery, the left common carotid artery and left subclavian artery, and the shape of the end section of the descending aorta are identified from the reference part data storage unit 97 as reference parts. Incidentally, when the heart and all of the blood vessels surrounding the heart are parts for which the 3D geometric model is generated, all of the parts (i.e. boundaries) set in the reference part data storage unit 97 become the reference parts. By setting characteristic parts such as the heart valves or boundaries of the cardio-vascular system as references, it is possible to suitably transform the 3D template.

The line data generator 93 then uses the data stored in the volume data storage unit 7 and template data storage unit 96 to carry out a line data generation processing (step S9). The line data generation processing will be explained by using FIG. 19 to FIG. 27.

First, the line data generator 93 identifies one unprocessed part from the reference parts (FIG. 19: step S21), and determines whether or not the identified reference part is a blood vessel boundary (step S23).

When the identified part is a blood vessel boundary (step S23: YES route), the line data generator 93 displays information representing which blood vessel boundary it is and 3D volume data on the display device, and prompts the user to designate the position of the slice plane in the 3D volume data, which corresponds to the blood vessel boundary. The user operates the mouse and/or keyboard, and designates the position in the slice plane that corresponds to the blood vessel boundary, while viewing the 3D volume data. Incidentally, when the user looks at the 3D volume data, the user can recognize a 3D heart shape. Therefore, the user can easily designate the position in the slice plane that corresponds to the blood vessel boundary. The input unit 1 then receives, from the user, the designation of the position of the slice plane (step S25), and outputs the position information of the designated slice plane to the line data generator 93.

Figure 20:
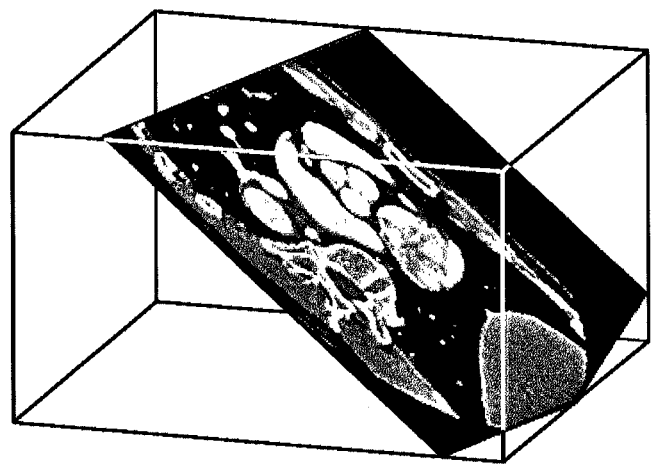
FIG. 20 is a diagram depicting an example of a cross-section image in a certain slice plane.
Figure 21:
FIG. 21 is a diagram depicting an example of edges extracted from the cross-section image.

Then, when the line data generator 93 receives the position information of the slice plane from the input unit 1, the line data generator 93 generates cross-section image data of the slice plane from the 3D volume data, and stores the generated data into the storage device (step S27). FIG. 20 illustrates an example of the cross-section image of a certain slice plane. The line data generator 93 then carries out edge extraction on the cross-section image (step S29). For example, the edges (i.e. contours) of the parts that are presumed to be the heart or blood vessels are extracted according to brightness values in the cross-section image or the like. FIG. 21 illustrates an example of the processing results of the edge extraction. Incidentally, in FIG. 21, the solid border lines indicate the extracted edges. The edge extraction is a well-known technique. Therefore, further explanation is omitted, here.

The line data generator 93 then displays the processing results of the edge extraction on the display device, and prompts the user to designate the edges corresponding to the blood vessel boundary. The user operates the mouse and/or keyboard, and designates the edges corresponding to the blood vessel boundaries, from among the displayed edges. Then, the input unit 1 receives the designation of the edges corresponding to the blood vessel boundaries (step S31), and outputs the identification information of the designated edges to the line data generator 93.

Figure 22:
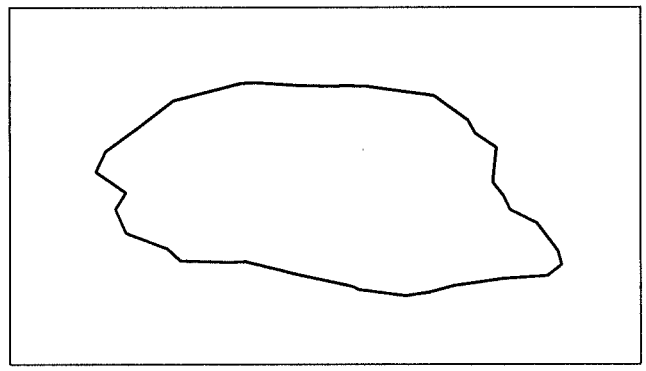
FIG. 22 is a diagram depicting an example of line data.

When the line data generator 93 receives the identification information from the input unit 1, the line data generator 93 associates the line data that represents the edges with information representing the blood vessel boundary, and stores the association information into the line data storage unit 98. FIG. 22 illustrates an example of the line data. After that, the processing moves to the processing of step S37.

On the other hand, when it is determined at the step S23 that the designated reference part is not a blood vessel boundary (step S23: NO route), the line data generator 93 determines whether or not the designated reference part is an annulus of a heart valve (step S35). When the designated reference part is not an annulus of a heart valve (step S35: NO route), or in other words, when the designated part is a heart apex, the processing moves to the processing of the step S37.

On the other hand, when the designated reference part is an annulus of a heart valve (step S35: YES route), the processing moves to the processing of step S39 (FIG. 23) via a terminal A.

Figure 23:
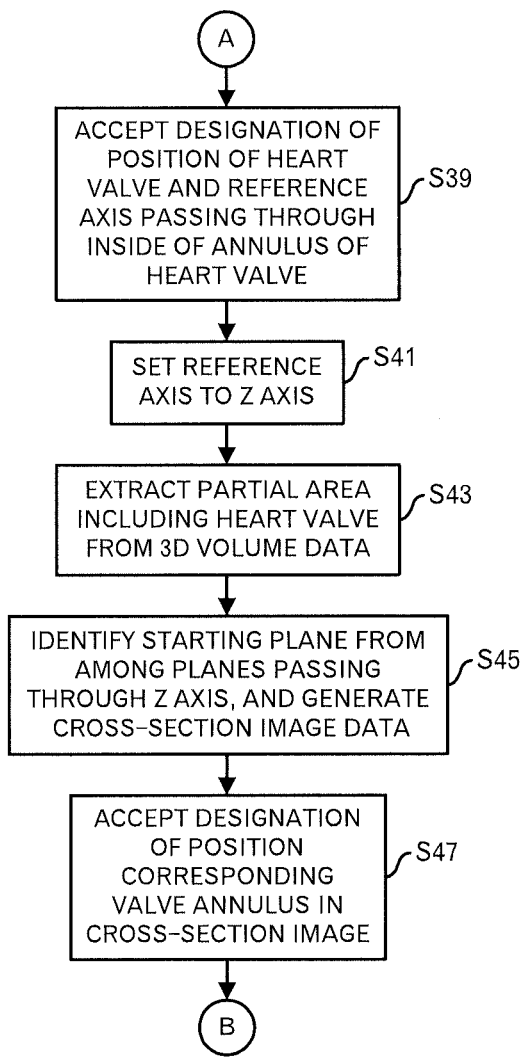
FIG. 23 is a diagram depicting a second portion of the processing flow of the line data generation processing.

Moving to explanation of FIG. 23, after the terminal A, the line data generator 93 displays information representing which heart valve it is and 3D volume data on the display device, and prompts the user to designate the position of the heart valve, and a reference axis that is an axis that passes through the inside of the annulus of that heart valve. The user operates the mouse and/or keyboard, and while looking at the 3D volume data, the user designates the position of the heart valve and the reference axis that passes through the inside of the annulus of that heart valve. Then, the input unit 1 receives the designation of the position of the heart valve and the reference axis that passes through the inside of the annulus of that heart valve from the user (FIG. 23: step S39), and outputs the position information of the heart valve and reference axis to the line data generator 93.

When the line data generator 93 receives the position information of the heart valve and reference axis from the input unit 1, the line data generator 93 sets the reference axis as the z axis (step S41). Then, according to the position information of the heart valve designated by the user, the line data generator 93 extracts a partial area that includes the heart valve from 3D volume data after the direction has been changed (step S43), and stores the data of the partial area into the storage device.

Figure 24:
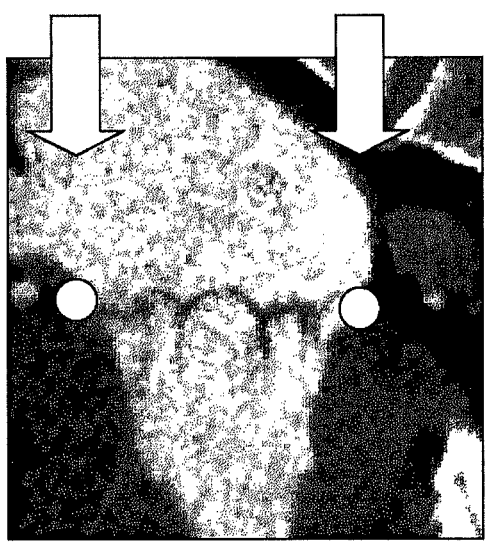
FIG. 24 is a diagram to explain a processing to extract the valve annulus.

After that, the line data generator 93 identifies the starting plane from among the planes that pass through the z axis, generates cross-section image data of the starting plane and stores the generated data into the storage device (step S45). The line data generator 93 then displays the cross-section image data on the display device, and prompts the user to designate the part corresponding to the valve annulus. While looking at the cross-section image, the user designates the part that corresponds to the valve annulus. For example, as illustrated in FIG. 24, the user designates two parts that correspond to the valve annulus. Incidentally, in FIG. 24, the white circles represent the parts that the user designated. The input unit 1 then receives the designation of the parts in the cross-section image, which correspond to the annulus (step S47), and outputs the position information of the designated parts to the line data generator 93. After that, the processing moves to the processing of step S49 (FIG. 25) via a terminal B.

Figure 25:
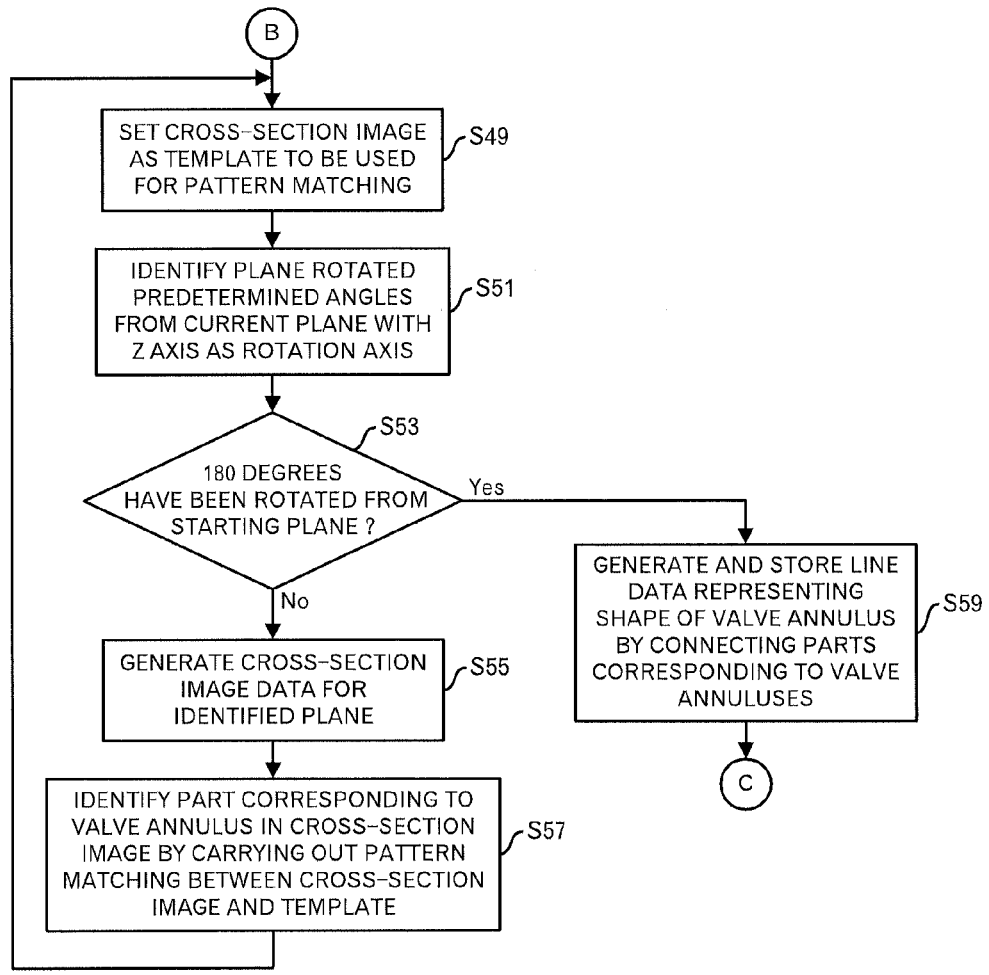
FIG. 25 is a diagram depicting a third portion of the processing flow of the line data generation processing.
Figure 26:
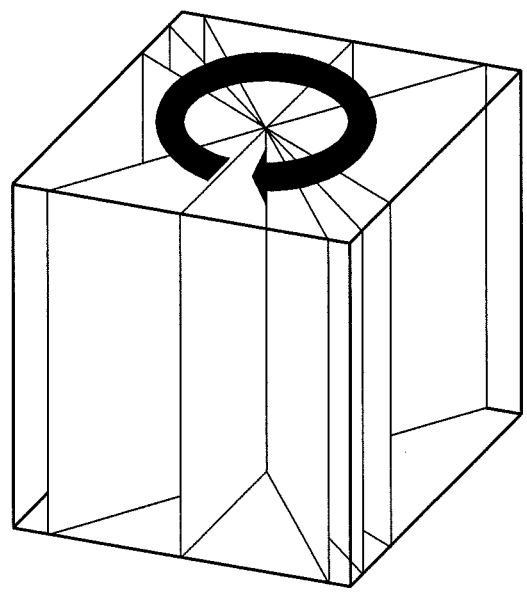
FIG. 26 is a diagram to explain a processing to extract the valve annulus.

Moving to explanation of FIG. 25, after the terminal B, the line data generator 93 sets the cross-section image of the current plane as the template to be used for pattern matching (FIG. 25: step S49). The line data generator 93 then identifies a plane that has been rotated a predetermined angle (for example, 5 degrees) from the current plane with the z axis as the axis of rotation (step S51). After that, the line data generator 93 determines whether or not the plane has rotated 180 degrees from the starting plane (step S53). In other words, the line data generator 93 determines whether or not the plane identified at the step S51 is the same plane as the starting plane. When the plane has not been rotated 180 degrees from the starting plane (step S53: NO route) the line data generator 93 generates cross-section image data for the identified plane (in other words, the rotated plane), and stores the generated data into the storage device, temporarily (step S55). The line data generator 93 then identifies the part corresponding to the valve annulus in the cross-section image by carrying out the pattern matching with cross-section images stored in the storage device and the template (step S57). After that, the processing returns to the step S49. In other words, the line data generator 93 sets the cross-section image of the current plane as the template, carries out the pattern matching of the template with the cross-section image of the next plane that is rotated a predetermined angle, and identifies the two parts (two locations) that correspond to the valve annulus. As illustrated in FIG. 26, the plane is gradually rotated from the starting plane until the plane has been rotated 180 degrees (or in other words, until the plane returns to the starting plane), and the processing of the steps S49 to S57 is repeated.

Figure 27:
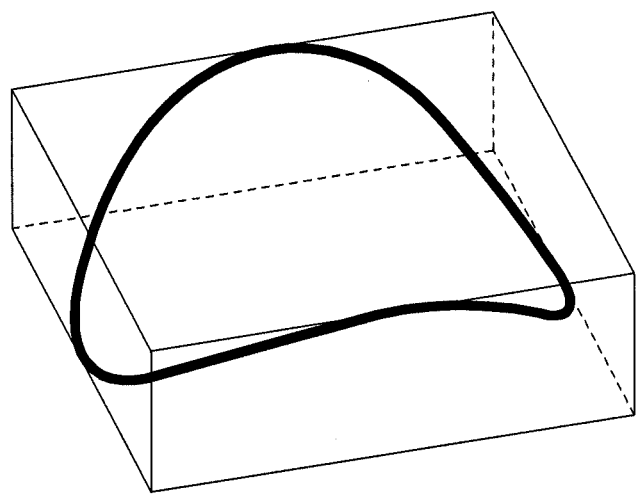
FIG. 27 is a diagram depicting a three-dimensional shape of the valve annulus.

On the other hand, when it is determined at the step S53 that the designated plane has been rotated 180 degrees from the starting plane (step S53: YES route), the line data generator 93 generates line data representing the shape of the valve annulus section by connecting the parts corresponding to the valve annulus, and then stores the generated line data into the line data storage unit 98 in association with information representing which annulus of the heart values it is (step S59). For example, the mitral valve annulus has a saddle type shape as illustrated in FIG. 27. In this embodiment, as described above, by carrying out the processing by rotating the plane gradually at predetermined angles around the z axis as the axis of rotation, the 3D shape of the valve annulus section is extracted and line data that represents that 3D shape is stored. After that, the processing moves to the processing of the step S37 via a terminal C.

Figure 19:
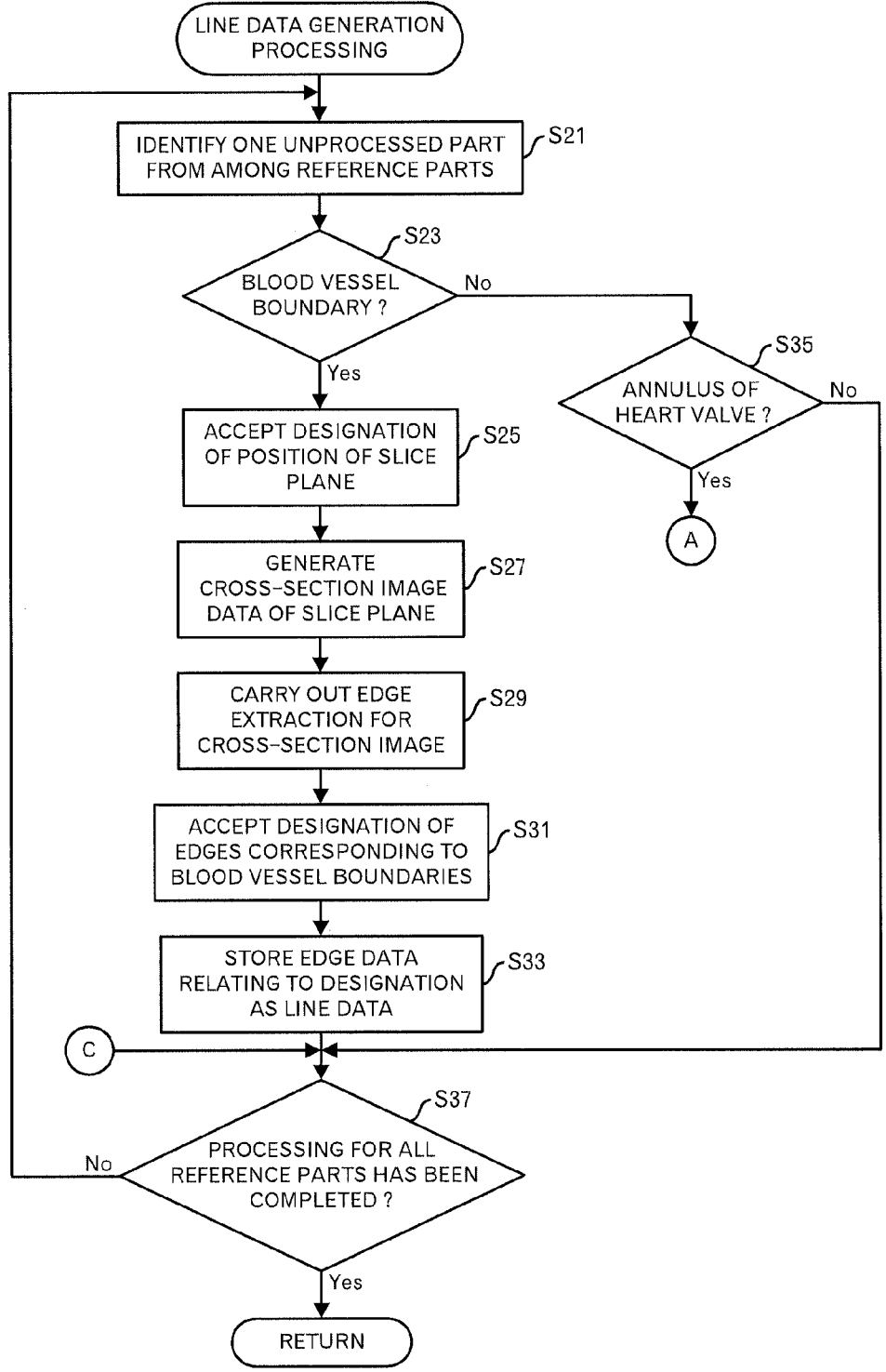
FIG. 19 is a diagram depicting a first portion of the processing of a line data generation processing.

Returning to the explanation of FIG. 19, the line data generator 93 determines whether or not the processing for all of the reference parts has been completed (step S37). When the processing for all of the reference parts has not been completed (step S37: NO route), the processing returns to the processing of the step S21, and the processing described above is repeated until the processing for all of the reference parts has been completed.

On the other hand, when the processing for all of the reference parts has been completed (step S37: YES route), this processing ends, and the processing returns to the calling source processing.

By carrying out the line data generation processing as described above, it is possible to generate line data that represents the 3D shape of the valve annulus section for a heart valve annulus, and it is possible to generate the line data that represents the 2D shapes of the blood vessel boundaries.

Figure 16:
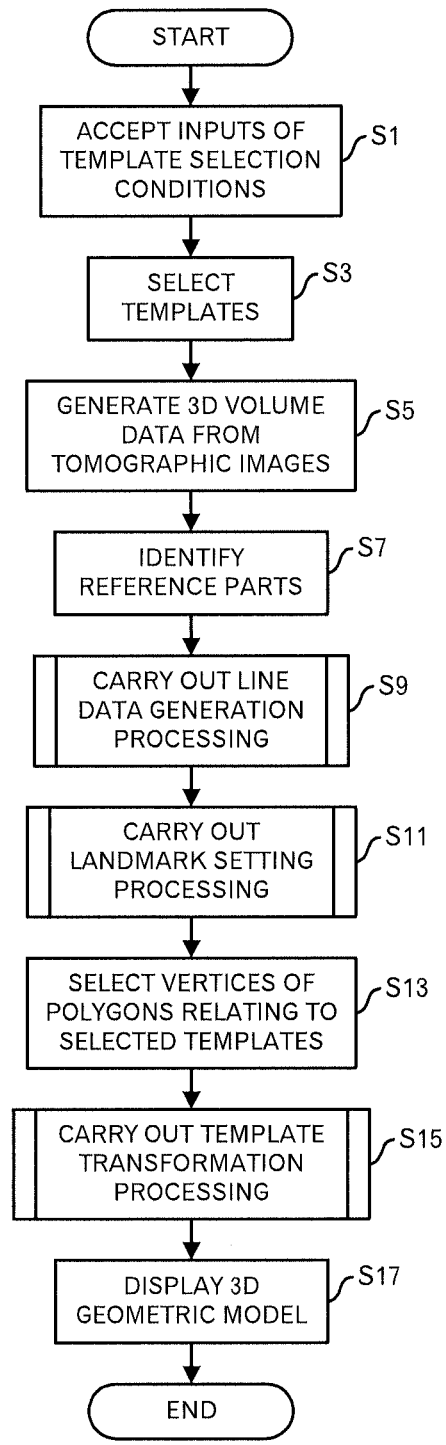
FIG. 16 is a diagram depicting a main processing flow in this embodiment.

Returning to the processing of FIG. 16, after carrying out the line data generation processing (step S9), the landmark setting unit 94 of the template processing unit 9 uses data stored in the template data storage unit 96 and line data storage unit 98 to carry out a landmark setting processing (step S11). In the landmark setting processing, the landmark setting unit 94 correlates, for each reference part, the shape of the reference part that is represented by the line data with the shape of the applicable reference part in the 3D template to set landmarks (i.e. starting points and target points). FIG. 28 illustrates an example of the line data for each of the reference parts and template data. The landmark setting processing will be explained in detail using FIG. 29 to FIG. 32.

First, the landmark setting unit 94 identifies one unprocessed part from among the reference parts (FIG. 29: step S61), and determines whether or not the identified reference part is a blood vessel boundary (step S63).

When the identified reference part is a blood vessel boundary (step S63: YES route), the landmark setting unit 94 acquires line data relating to the identified reference part (i.e. blood vessel boundary) from the line data storage unit 98 (step S65). The landmark setting unit 94 also acquires template data relating to the identified reference part (i.e. blood vessel boundary) from the template data storage unit 96 (step S67). Incidentally, the processing of steps S65 and S67 may be executed in parallel or in reverse order.

Figure 30:
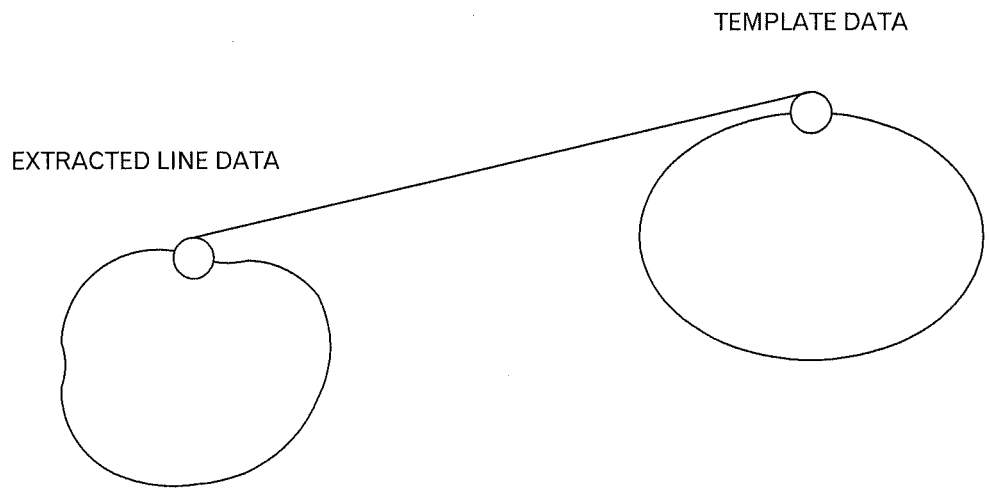
FIG. 30 is a diagram to explain a processing to determine a reference point.
Figure 31:
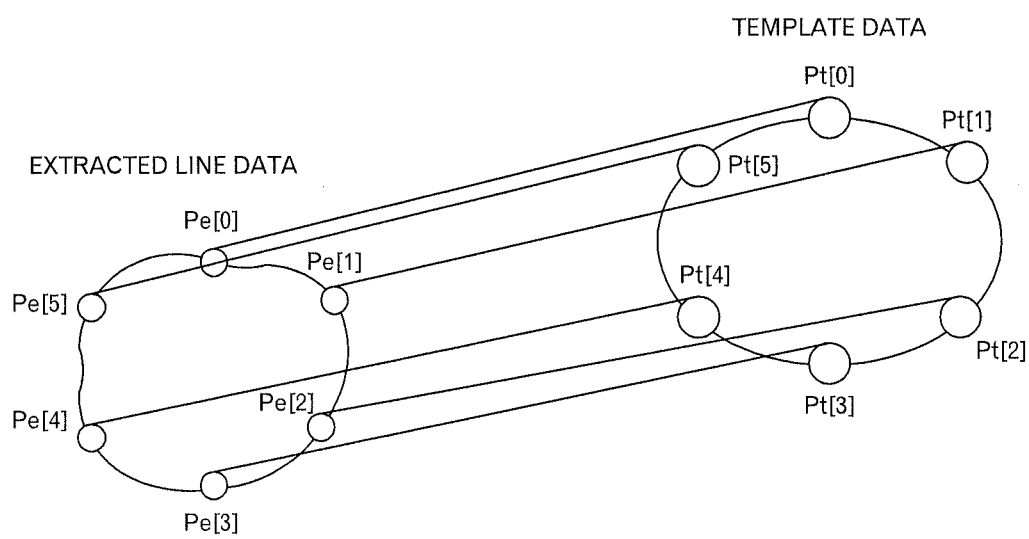
FIG. 31 is a diagram depicting an example of landmarks (starting point and target point)

The landmark setting unit 94 then identifies reference points for associating the edges on each of the edges of the blood vessel boundaries represented by the line data and the edges of the blood vessel boundaries in the template data (step S69). For example, since the blood vessel boundaries have an elliptical or a shape close to elliptical, correlation is carries out such that the major axes and the minor axes of them respectively correspond. As illustrated in FIG. 30, the landmark setting unit 94 sets a point in the 12 o'clock direction (i.e. intersection with the minor axis) as the reference point. The method for setting the reference point is not limited to this, and it is possible to employ other methods.

The landmark setting unit 94 then arranges n landmarks (i.e. starting points) at regular intervals from the reference point on the edge represented by the template data, and registers the coordinates of each starting point into the landmark storage unit 99 (step S71). The number of landmarks may be a preset number, or may be determined from the length of the edge. For example, in the case of n=5, as illustrated on the right side of FIG. 31, starting point Pt[0] is located at the reference point, and the landmarks Pt[1] Pt[2], . . . , Pt[5] are arranged in order in the clockwise direction.

The landmark setting unit 94 then arranges n landmarks (target points) starting from the reference point on the edge represented by the line data at regular intervals, and registers the coordinates of each target point into the landmark storage unit 99 (step S73). For example, in case of n=5, as illustrated on the left side of FIG. 31, a target point Pe[0] is placed at the reference point, and points Pe[1], Pe[2], . . . , Pe[5] are arranged in order in the clockwise direction. The starting points and target points are arranged from the reference point by the same rule and the same number. Therefore, Pt[i] corresponds to Pe[i] For example, in FIG. 31, the starting point Pt[0] corresponds to the target point Pe[0], the starting point Pt[1] corresponds to the target point Pe[1], the starting point Pt[2] corresponds to the target point Pe[2], the starting point Pt[3] corresponds to the target point Pe[3], the starting point Pt[4] corresponds to the target point Pe[4], and the starting point Pt[5] corresponds to the target point Pe[5]. The coordinates of the starting points and target points are stored in the landmark storage unit 99 so as to grasp the correlation between the starting points and target points. The processing of steps S71 and S73 may be carried out in parallel or may be carried out in reverse order. After that, the processing shifts to the processing of the step S75.

On the other hand, at the step S63, when it is determined that the identified reference part is not a blood vessel boundary (step S63: NO route), the processing moves to the processing of step S77 (FIG. 32) via a terminal D.

Figure 32:
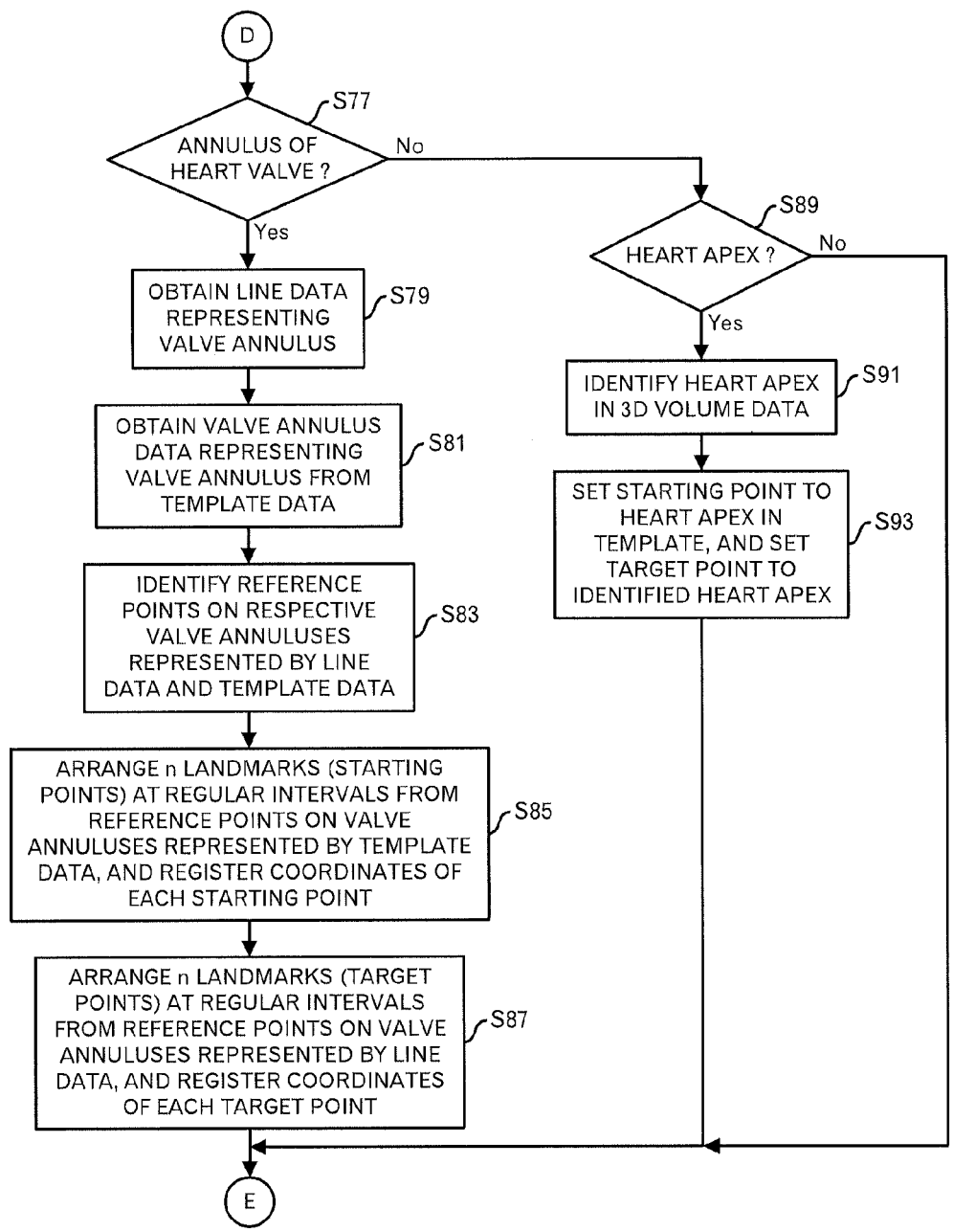
FIG. 32 is a diagram depicting a second portion of the processing flow of the landmark setting processing.

Moving to explanation of FIG. 32, after the terminal D, the landmark setting unit 94 determines wither or the identified reference part is an annulus of the heart valve (FIG. 32: step S77). When the identified reference part is an annulus of the heart valve (step S77: YES route), the landmark setting unit 94 acquires the line data relating to the identified reference part (i.e. valve annulus) from the line data storage unit 98 (step S79) The landmark setting unit 94 also acquires template data relating to the identified reference part (i.e. valve annulus) from the template data storage unit 96 (step S81). Incidentally, the processing of the steps S79 and S81 may be carried out in parallel, or may be carried out in reverse order.

The landmark setting unit 94 then identifies a reference point for associating the valve annuluses on each of the valve annuluses represented by the line data and represented by the template data (step S83). For example, the landmark setting unit 94 identifies the center of gravity of a triangular obtained by connecting the centers of the annuluses of the tricuspid valve, aortic valve and mitral valve, and identifies the point close to the identified center of gravity as the reference point. Incidentally, the method for setting the reference point is not limited to this, and it is possible to employ other methods.

The landmark setting unit 94 then places n landmarks (i.e. starting points) on the valve annulus represented by the template data at regular intervals from the reference point, and registers the coordinates of each starting point into the landmark storage unit 99 (step S85). The processing of this step is basically the same as the processing of the step S71.

The landmark setting unit 94 then places n landmarks (i.e. target points) on the annulus represented by the line data at regular intervals from the reference point, and registers the coordinates of each target point into the landmark storage unit 99 (step S87). The processing of this step is basically the same as the processing of the step S73. As described above, the coordinates of the starting points and target points are stored in the landmark storage unit 99 so as to grasp the correlation between the starting points and the target points. The processing of the steps S85 and S87 may be carried out in parallel, or may be carried out in reverse order. After that, the processing moves to the processing of the step S75 (FIG. 29) via a terminal E.

On the other hand, when it is determined at the step S77 that the identified reference part is not an annulus of the heart valve (step S77: NO route), the landmark setting unit 94 determines whether or the identified reference part is a heart apex (step S89). When the identified reference part is not a heart apex (step S89: NO route), the processing moves to the processing of the step S75 (FIG. 29) via the terminal E.

On the other hand, when the identified reference part is a heart apex (step S89: YES route), the landmark setting unit 94 identifies the heart apex in the 3D volume data (step S91). Incidentally, the 3D volume data may be displayed so as to prompt the user to identify the heart apex.

Then, the landmark setting unit 94 sets a starting point at the heart apex in the 3D template, and sets a target point at the identified heart apex, and stores the coordinates of the starting point and target point into the landmark storage unit 99 (step S93). After that, the processing moves to the processing of the step S75 (FIG. 29) via the terminal E.

Figure 29:
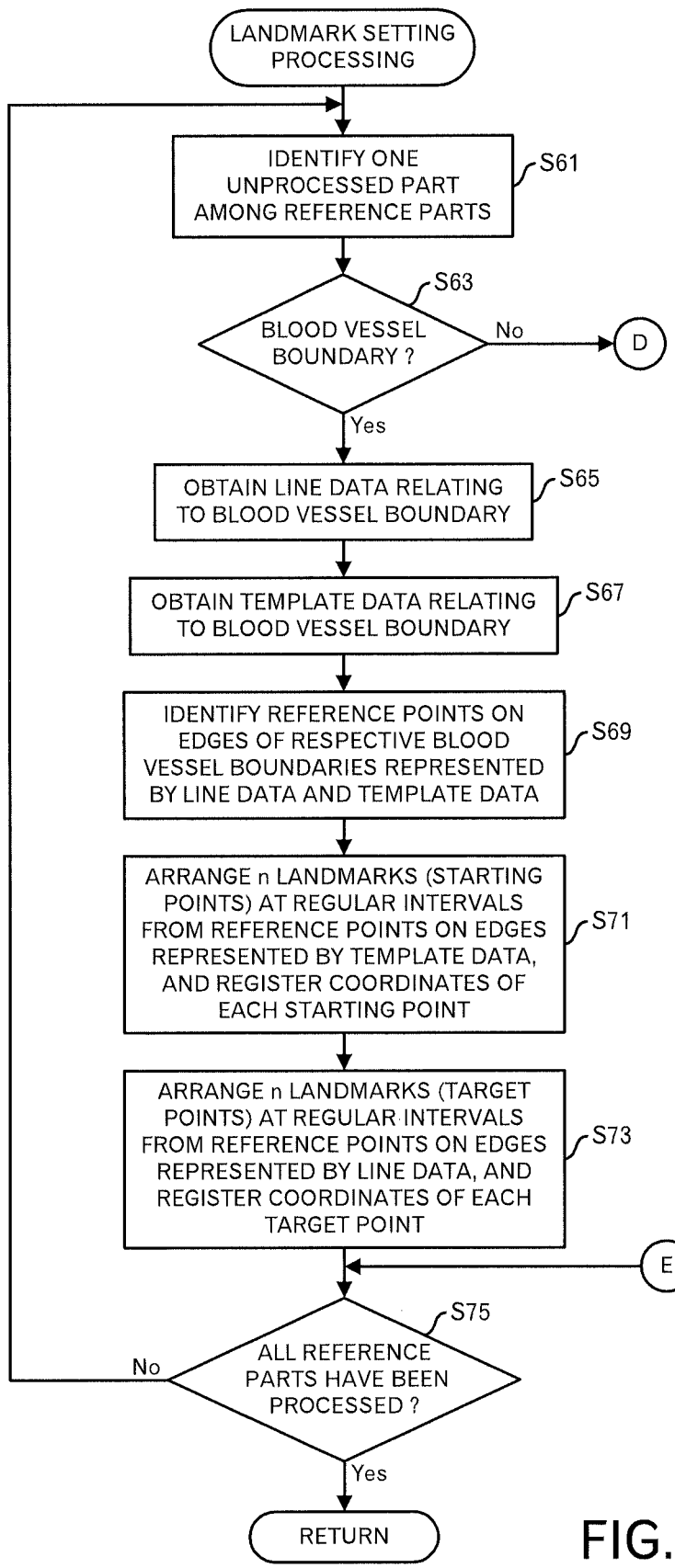
FIG. 29 is a diagram depicting a first portion of a processing flow of a landmark setting processing.

Returning to the explanation of FIG. 29, the landmark setting unit 94 determines where or not the processing has been completed for all reference parts (step S75). When the processing has not yet been completed for all reference parts (step S75: NO route), the processing returns to the processing of the step S61, and the processing described above is repeated until the processing has been completed for all reference parts.

On the other hand, when the processing has been completed for all reference parts (step S75: YES route), the processing returns to the calling source processing.

Returning to the processing in FIG. 16, after the landmark setting processing (step S11) has been performed, the template transform unit 95 of the template processing unit 9 selects the vertices of the polygons of the 3D template selected at the step 3 as the objects of transformation (step S13). The template transform unit 95 uses data stored in the template data storage unit 96 and stored in the landmark storage unit 99 to carry out a template transformation processing (step S15). The template transformation processing will be explained using FIG. 33 and FIG. 34. In this embodiment, Thin-Plate Spline (TPS) transformation is used for the 3D template transformation. As for the details about TPS transformation, refer to F. L. Bookstein, "Principal Warps: Thin-Plate Splines and the Decomposition of Deformations," IEEE Transactions on Pattern Analysis and Machine Intelligence, vol. 11, no. 6, pp. 567-585, June, 1989.

Before explaining the processing flow of the template transformation processing in detail, the functions that are used in the 3D template transformation will be explained. In this embodiment, a function z(x, y) is used to calculate the positions of the movement destinations of the vertices that are the objects of transformation.

$$z(x, y) = a_1 + a_2 x - a_3 y + \sum_{i=1}^{No.p} w_i U(|[x_i y_i] - [xy]|) \quad (1)$$

Figure 33:
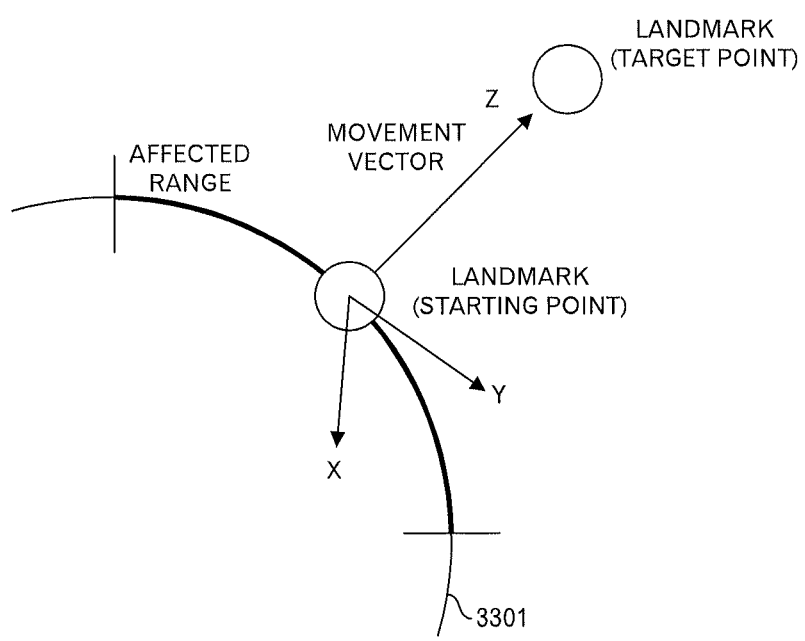
FIG. 33 is a diagram to explain a movement vector.

In the equation (1), "$a_1+a_2x+a_3y$" represents a linear processing, and also represents movement of a plane. Moreover, "$\Sigma w_i U(|[x_i y_i]-[xy]|)$" represents a non-linear processing, and also represents the generation of a spline plane. The coordinates after the movement are calculated using the function z(x, y), and represented in the coordinate system of the movement vector. In other words, as illustrated in FIG. 33, the vector that connects the starting point and target point is set as the z axis, and the x and y axes are orthogonal to the vector (the origin is the starting point of the vector). U represents an arbitrary function, and p represents the number of landmarks. In the equation (1), the variables $a_1$, $a_2$, $a_3$ and $w_i$ (i=1, 2, . . . , p) are unknown variables, and the values of these variables $a_1$, $a_2$, $a_3$ and $w_i$ are found by solving the simultaneous equations below.

$$\begin{bmatrix} K & P \\ P^T & O \end{bmatrix} \cdot \begin{bmatrix} w \\ a \end{bmatrix} = \begin{bmatrix} v \\ o \end{bmatrix} \quad (2)$$

Here, K is a p*p matrix, and when it is assumed that $K_{ij}$ is an element in the ith row and jth column, K is represented by "$K_{ij}=U(|[x_i y_i]-[x_j y_j]|)$". Incidentally, "$|[x_i y_i]-[x_j y_j]|$" represents the distance between the coordinates $x_i y_i$ and $x_j y_j$. In the equation (2), P, O, w, a, v and o are matrices as given below. As for the position of the landmark, because the value z(x, y) has already been known, the known values are set into P and v as illustrated below. $P^T$ is a transverse matrix of P.

$$P = \begin{bmatrix} 1 & x_1 & y_1 \\ \vdots & \vdots & \vdots \\ 1 & x_p & y_p \end{bmatrix} \quad O = \begin{bmatrix} 0 & 0 & 0 \\ 0 & 0 & 0 \\ 0 & 0 & 0 \end{bmatrix} \quad w = \begin{bmatrix} w_1 \\ \vdots \\ w_p \end{bmatrix} \quad a = \begin{bmatrix} a_1 \\ a_2 \\ a_3 \end{bmatrix} \quad v = \begin{bmatrix} z_1 \\ \vdots \\ z_p \end{bmatrix} \quad o = \begin{bmatrix} 0 \\ \vdots \\ 0 \end{bmatrix}$$

In FIG. 33, the curve 3301 schematically illustrates a surface that is represented by polygons. This will be explained in detail later, however, when performing local transformation, the affected range is determined using the landmark (i.e. starting point) as a reference, and vertices in the affected range become the objects of transformation. In FIG. 33, the bold line section of the curve 3301 is the affected range.

Figure 34:
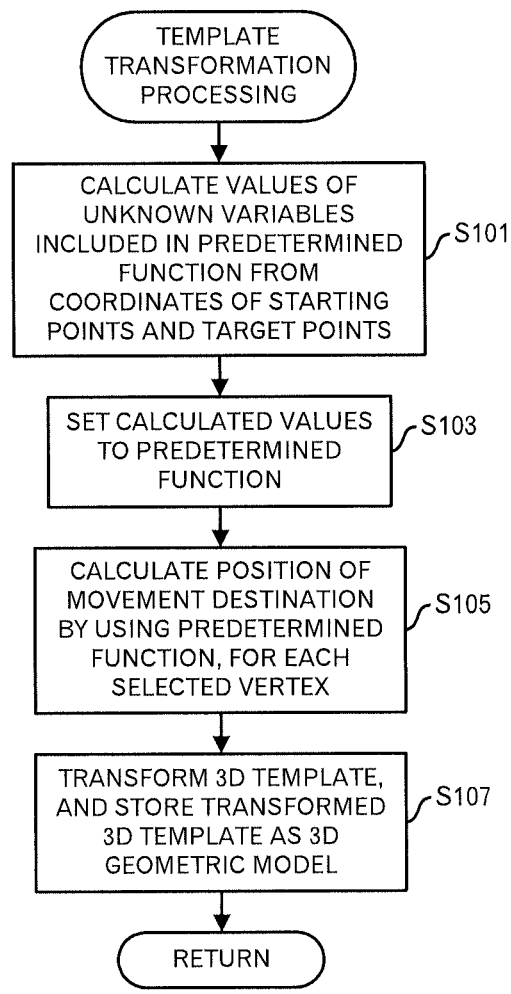
FIG. 34 is a diagram depicting a processing flow of a template transformation processing.

The processing flow of the template transformation processing is explained below. First, the template transform unit 95 acquires the coordinates of the starting point and target point of each landmark from the landmark storage unit 99, and calculates the values of the variables $a_1$, $a_2$, $a_3$ and $w_i$ in the equation (1) from the coordinates of the starting point and target point (FIG. 34: step S101). More specifically, according to the landmarks, the template transform unit 95 substitutes values into K, P, $P^T$ and v in the equation (2), and calculates the values of the variables $a_1$, $a_2$, $a_3$ and $w_i$ by solving the simultaneous equations. The template transform unit 95 then sets the values of the variables $a_1$, $a_2$, $a_3$ and $w_i$ that were calculated at the step S101 into the equation (1) (step S103). After that, the template transform unit 95 calculates the position of the movement destination using the equation (1) for each of the vertices that were selected at the step S13 (step S105). As for the point where the landmark is set, z(x, y) is known. Therefore, the position of the movement destination does not need to be calculated.

Then, the template transform unit 95 uses the positions of the movement destination of each vertex to transform the 3D template, and stores the transformed 3D template as a 3D geometric model into the 3D geometric model storage unit 11 (step S107). After that, the processing returns to the calling source processing.

Returning to the processing in FIG. 16, after the template transformation processing (step S15) has been performed, the output unit 13 displays the 3D geometric model that is stored in the 3D geometric model storage unit 11 on the display device (step S17). After that, this processing ends.

By carrying out the processing such as described above, it becomes possible to generate a 3D geometric model by transforming a 3D template so as to match with the position and angle of the heart shape in the tomographic images. Incidentally, parts that are doorways of the blood flows, such as the boundaries between the heart and the heart blood vessels, and the heart valves, are characteristic positions of the heart. By carrying out transformation using such characteristic positions as references, it is possible to generate a 3D geometric model that is very close to the actual shape of a patient's heart. It is also possible to eliminate the time required to draw boundary lines such as the heart muscles inner wall section, heart muscles outer wall sections, blood vessels and the like for several hundred tomographic images, and thus it is possible to greatly reduce the work load on the physician.

For example, it is difficult for apart such as the chordae tendineae to be seen in the tomographic image such as a CT image or MRI image, and to distinguish such a part from the tomographic image, however, with the method described above, it is possible to easily generate a 3D geometric model that includes such parts.

Next, the processing flow of the step (4) illustrated in FIG. 14 will be explained in detail using FIG. 35 to FIG. 42. Incidentally, the processing explained below is a processing for matching the shapes of details in the generated 3D geometric model with the heart shape in the tomographic image. For example, in a landmark screen such as illustrated in FIG. 35, a 3D geometric model is transformed while the user manually sets landmarks (e.g. starting points and target points).

Figure 35:
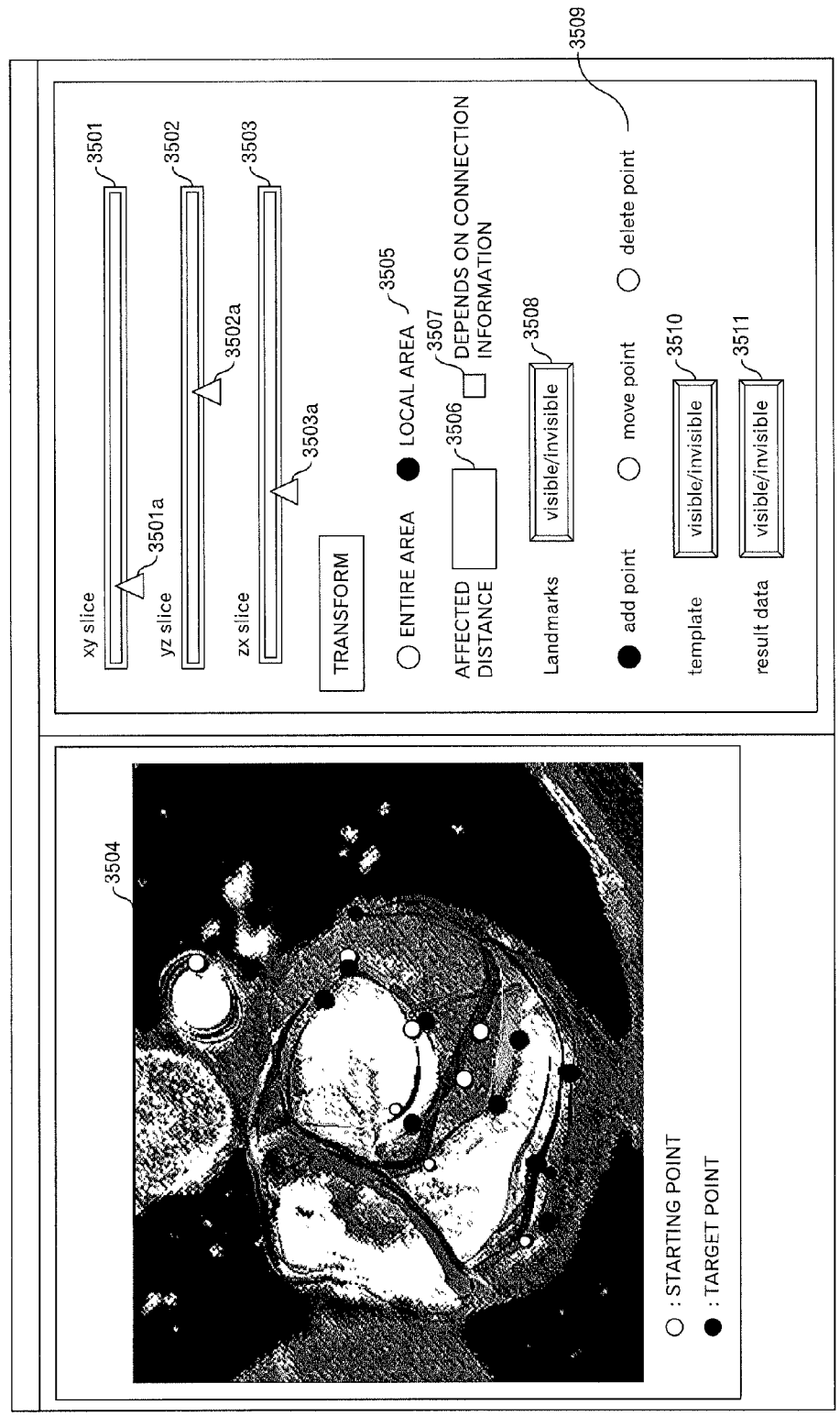
FIG. 35 is a diagram depicting a screen example of a landmark setting screen.
Figure 36:
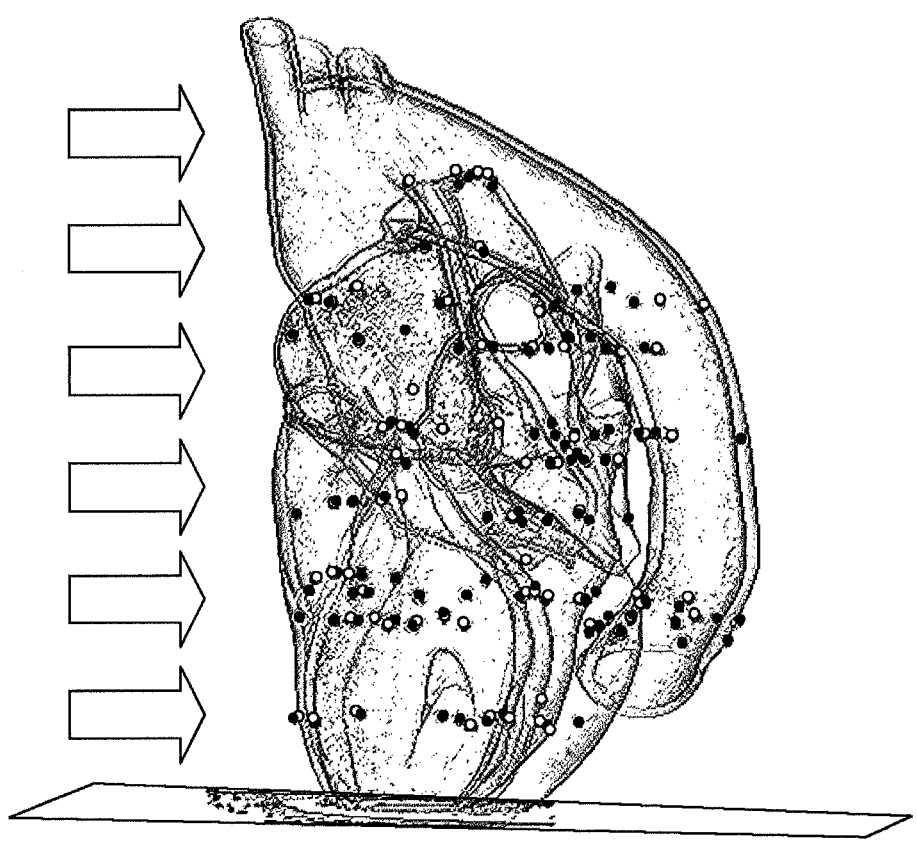
FIG. 36 is a diagram depicting an example of 3D geometric model for which transformation is carried out for a plane perpendicular to a major axis of the heart.
Figure 37:
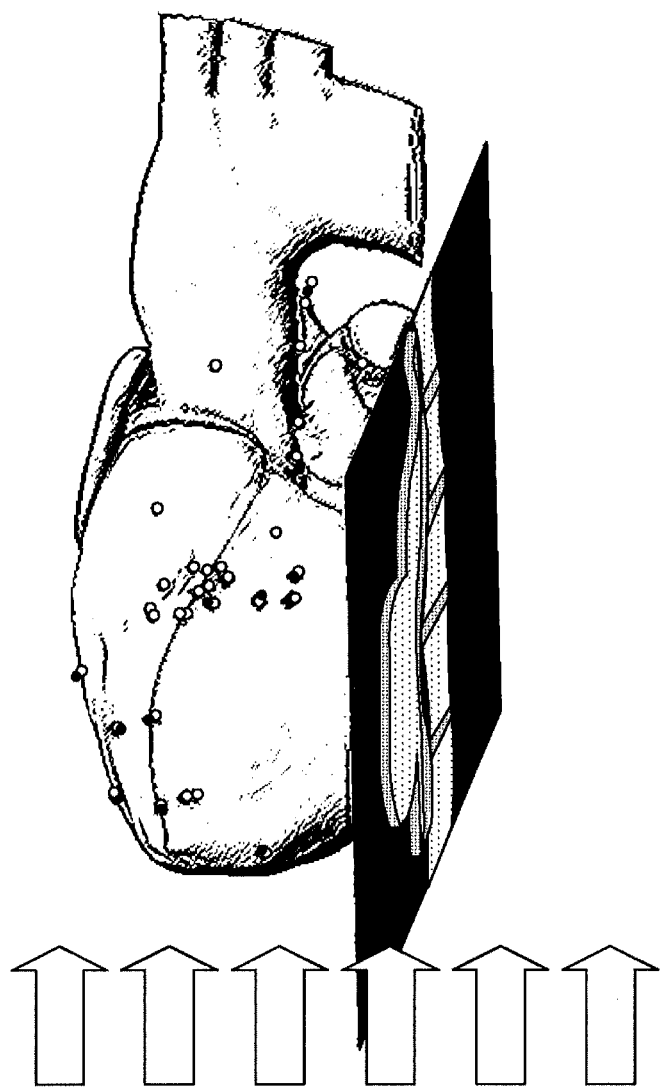
FIG. 37 is a diagram depicting an example of the 3D geometric model for which transformation is carried out for a plane perpendicular to the major axis of the heart.

In screen illustrated in FIG. 35, by moving a knob 3501a of a slider 3501 for the xy plane, a knob 3502a of a slider 3502 for the yz plane and a knob 3503a of a slider 3503 for the zx plane, a slice plane can be designated. In the cross-section image display field 3504, a cross-section image of the slice plane either in the 3D volume data or 3D geometric model is displayed. In the cross-section image display field 3504, white dots indicate starting points, and black dots indicate target points (this is the same hereafter). It is also possible to make a selection using the radio button 3505 of whether to perform overall transformation or local transformation. When "local area" is selected using the radio button, the user inputs the affected distance into the input field 3506, and designates in the check box 3507 whether or not the affected range depends on the connection information of the polygons. The affected range is explained later using FIG. 41. Using the switching button 3508 for switching between the displaying and not displaying the landmarks, it is possible to switch between displaying and not displaying landmarks (starting points and target points) in the cross-section image display field 3504. Furthermore, it is possible to use the radio button 3509 to select whether to perform the operation "add point" (add a landmark), "move point" (move a landmark) or "delete point" (delete a landmark). Using the switch button 3510 for switching between display and not displaying a template, it is possible to switch between displaying and not displaying a 3D template in the cross-section image display field 3504. Moreover, using the switch button 3511 for switching whether to display or not display transformation results, it is possible to switch between displaying and not displaying transformation results in the cross-section image display field 3504. For example, as illustrated in FIG. 36, while the user sets landmarks on plural planes that are perpendicular with the major axis of the heart, and as illustrated in FIG. 37, sets landmarks on plural planes that are parallel with the major axis of the heart, the transformation of the 3D geometric model is carried out.

Figure 14:
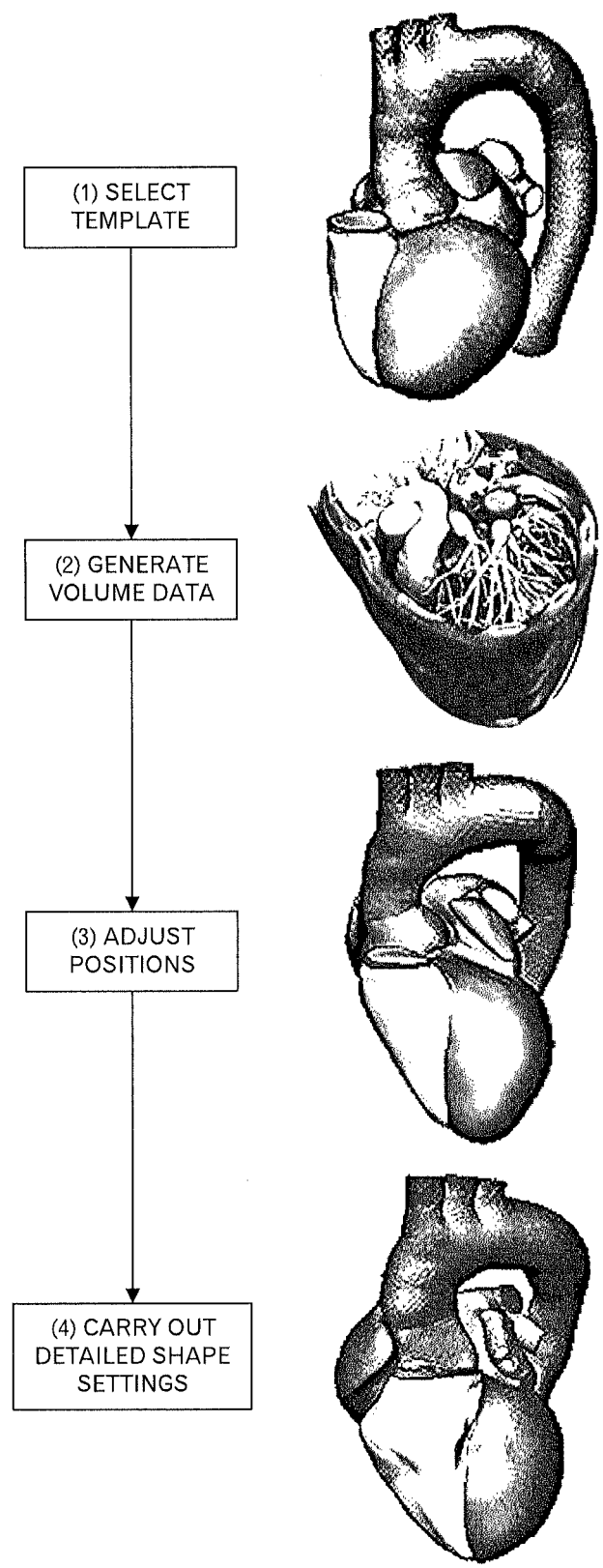
FIG. 14 is a diagram depicting an entire flow of this embodiment.
Figure 38:
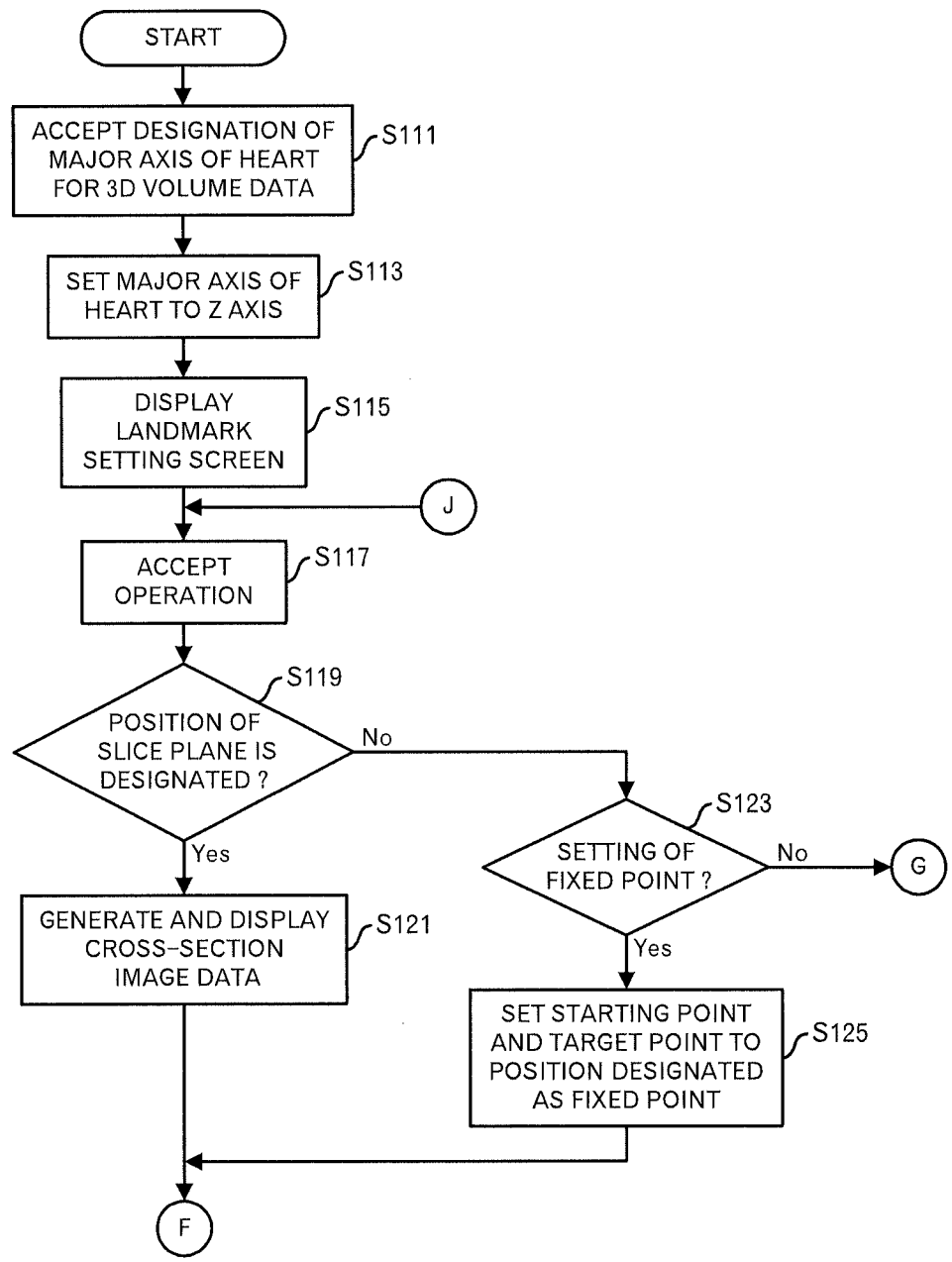
FIG. 38 is a diagram depicting a first portion of a second main processing flow of this embodiment.
Figure 39:
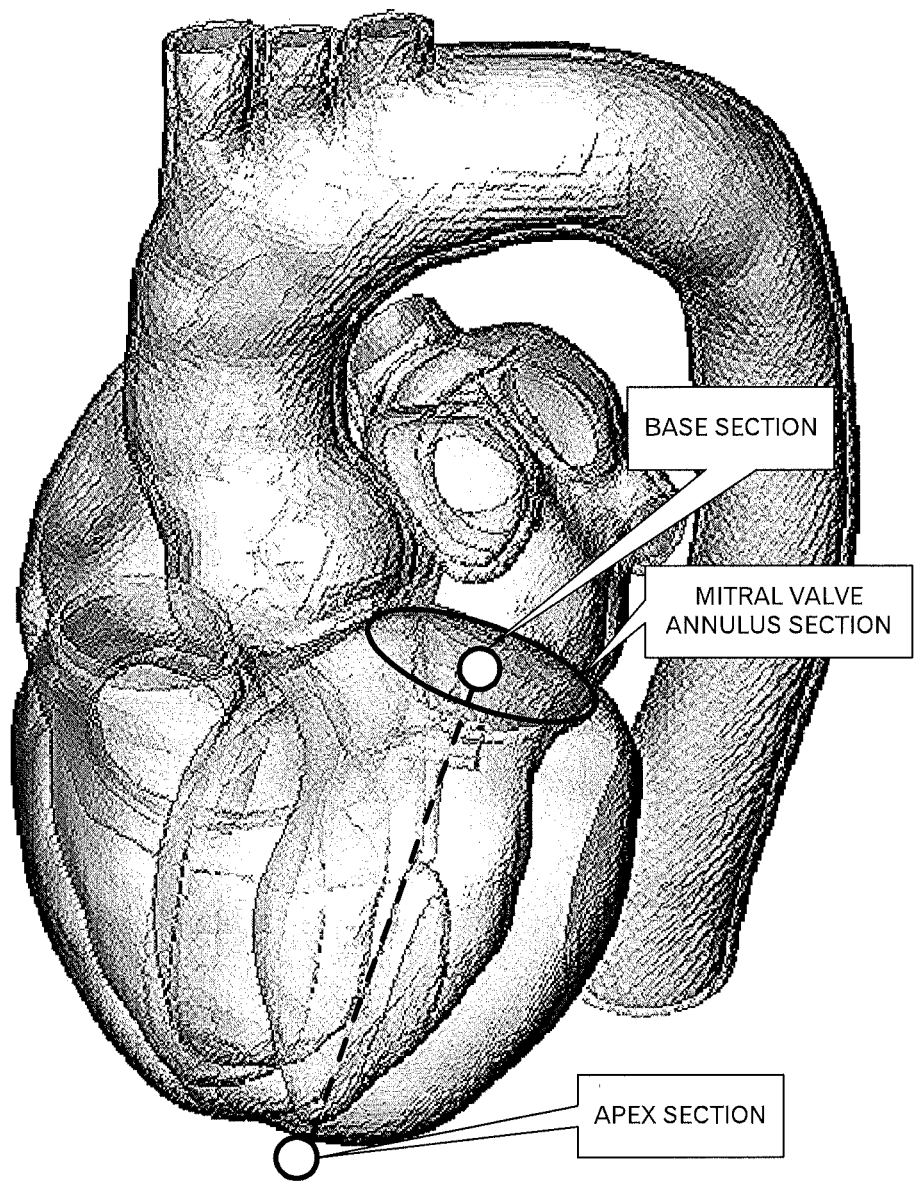
FIG. 39 is a diagram to explain the major axis of the heart.

The processing flow for the step (4) illustrated in FIG. 14 is illustrated in detail in FIG. 38. It is presumed that, before starting the processing flow illustrated in FIG. 38, the processing of the steps (1) to (3) in FIG. 14 have already been completed. First, the input unit 1 receives designation of the major axis of the heart for 3D volume data from the user (FIG. 38: step S111) and outputs position information for the designated major axis of the heart to the template transform unit 95. Incidentally, as depicted in FIG. 39, the axis that passes through the heart apex and the base section that is the center of the mitral valve annulus section is called the major axis of the heart.

When the template transform unit 95 receives the position information for the major axis of the heart from the input unit 1, the template transform unit 95 reads the 3D volume data from the volume data storage unit 7, and reads the 3D geometric model from the 3D geometric model storage unit 11. The template transform unit 95 then sets the major axis of the heart as the z axis for each of the 3D volume data and 3D geometric model (step S113). As for the 3D geometric model, data concerning the major axis of the heart, which is included in the 3D template is used.

After that, the output unit 13 generates landmark setting screen data such as illustrated in FIG. 35 and displays the generated data on the display device (step S115). On the displayed landmark setting screen, the user performs operations such as moving the knobs 3501a to 3503a of the sliders 3501 to 3503 and designating the position of the slice plane, and clicking on the button 3510 or button 3511 to switch whether to display and not display information.

The input unit 1 then receives the operation from the user (step S117), and determines whether the received operation is designation for the position of a slice plane (step S119). When the received operation is designation for the position of a slice plane (step S119: YES route), the input unit 1 causes the output unit 13 to display the cross-section image of the slice plane. The output unit 13 generates a cross-section image of the designated slice plane for each of the 3D volume data and 3D geometric model, generates image data that the cross-section images are superimposed, and then displays the generated image data in the cross-section image display filed 3504 on the landmark setting screen (step S121). Incidentally, each of the cross-section images may be displayed separately instead of the superimposed images. After that, the processing moves to the processing of step S153 (FIG. 42) via a terminal F.

On the other hand, when the received operation is not designation for the position of the slice plane (step S119: NO route), the input unit 1 determines whether or not the received operation is setting of a fixed point (step S123). In the template transformation processing, when there is a point that is not to move, such a point is designated as a fixed point. When the received operation is setting of a fixed point (step S123: YES route), the landmark setting unit 94 of the template processing unit 9 sets a starting point and target point at the position designated as a fixed point (step S125). In other words, because the same coordinates are set for the starting point and target point, such a point will not move. After that, the processing moves to the processing of the step S153 (FIG. 42) via the terminal F.

On the other hand, when the received designation is not setting of a fixed point (step S123: NO route), the processing moves to a processing of step S127 (FIG. 40) via a terminal G.

Figure 40:
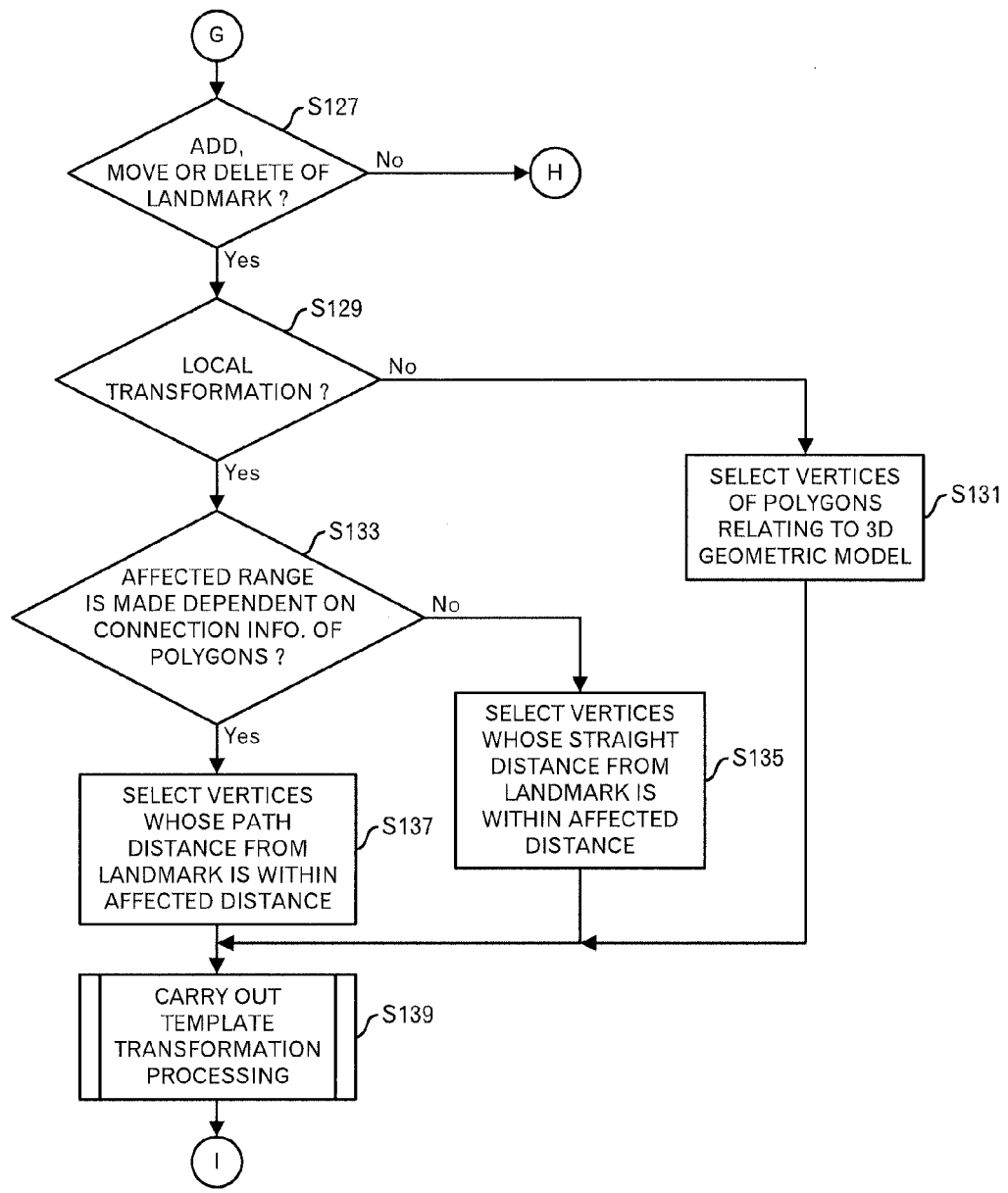
FIG. 40 is a diagram depicting a second portion of the second main processing of this embodiment.

Moving to explanation of FIG. 40, after the terminal G, the input unit 1 determines whether or the received operation is addition, movement or deletion of a landmark (FIG. 40: step S127). When the received operation is not addition, movement or deletion of a landmark (step S127: NO route), the processing moves to a processing of step S141 (FIG. 42) via a terminal H.

However, when the received operation is addition, movement or deletion of a landmark (step S127: YES route), the input unit 1 registers the data into the landmark storage unit 99, or updates or deletes the data stored in the landmark storage unit 99.

After that, the template transform unit 95 of the template processing unit 9 determines whether the local transformation was designated (step S129). More specifically, the template transform unit 95 determines whether or not the "local area" radio button 3505 on the landmark setting screen illustrated in FIG. 35 was selected. When the local transformation was not designated (step S129: NO route), the template transform unit 95 selects the vertices of the polygons relating to the 3D geometric model as the objects of transformation (step S131). The processing then moves to the processing of step S139.

On the other hand, when the local transformation was designated (step S129: YES route), the template transform unit 95 determines whether or not to have the affected range depend on the connection information of the polygons (step S133). More specifically, the template transform unit 95 determines whether or not the check box 3507 on the landmark setting screen illustrated in FIG. 35 was checked. Incidentally, the affected range will be explained using FIG. 41.

Figure 41:
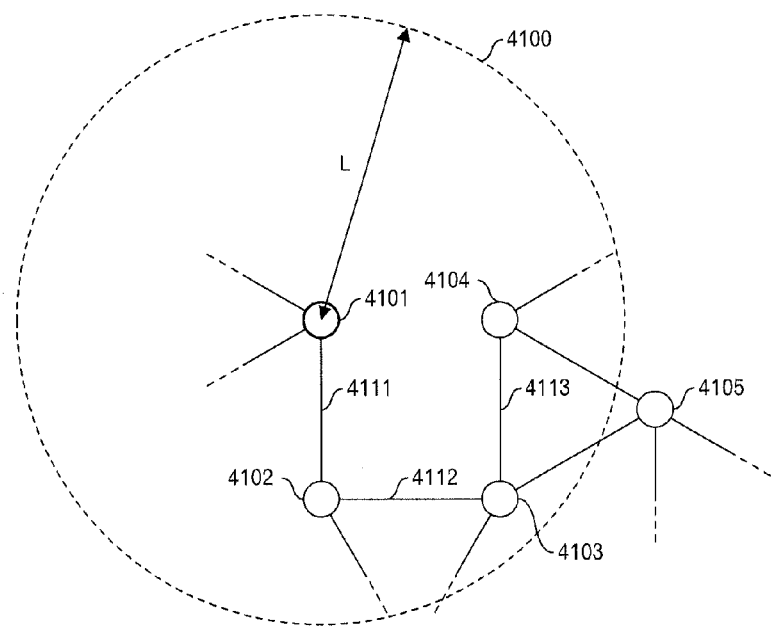
FIG. 41 is a diagram to explain an affected range.

FIG. 41 illustrates a portion of a 3D template. It is assumed that the vertex 4101 in FIG. 41 is a landmark (starting point). For example, when the affected range is not to depend on the connection information of the polygons, the inside of the circle 4100 having a radius L (L is the affected distance) and the landmark (i.e. starting point) as the center becomes the affected range in the example in FIG. 41. In other words, the vertices (vertices 4101 to 4104 in FIG. 41) whose straight distance from the landmark (starting point) is within the affected distance become the objects of transformation, and vertices (vertex 4105 in FIG. 41) whose straight distance from the landmark (starting point) exceeds the affected distance are not objects of transformation. Incidentally, the value inputted in the input field 3506 on the landmark setting screen illustrated in FIG. 35 is used as the affected distance L. On the other hand, when the affected range is made dependent on the connection information of the polygons, vertices whose path distance from the landmark (i.e., starting point) to the vertex is within the affected distance become the objects of transformation. For example, in FIG. 41, when the path from vertex 4101 to vertex 4104 is a route "vertex 4101→vertex 4102→vertex 4103→vertex 4104", the total of the length of the edge 4111, the length of the edge 4112 and the length of the edge 4113 is the path distance from vertex 4101 to vertex 4104. Here, when the path distance from the vertices 4101 to 4104 exceeds the affected distance, the vertex 4104 is not an object of transformation even though it is within the circle 4100.

When the affected range is not made to be dependent on the connection information of the polygons (step S133: NO route), or in other words, when the check box 3507 is not checked, the template transform unit 95 selects vertices whose straight line distance from the landmark (starting point) is within the affected distance as the objects of transformation (step S135). Then the processing moves to a processing of step S139.

On the other hand, when the affected range is made to be dependent on the connection information of the polygons (step S133: YES route), or in other words, when the check box 3507 is checked, the template transform unit 95 selects the vertices whose path distance from the landmark (starting point) is within the affected distance as objects of transformation (step S137). Then, the processing moves to the processing of the step S139.

The template transform unit 95 then uses the data stored in the template data storage unit 96 and landmark storage unit 99 to carry out the template transformation processing (step S139). In other words, the template transform unit 95 carries out the template transformation processing by using the landmarks that were set by the user. Incidentally, because the template transformation processing is the same as the processing explained above (FIG. 34), further explanation is omitted here. However, when the local transformation is instructed, the transformation of the step S107 (FIG. 34) is carried out for the vertices selected at the step S135 or S137. In addition, when displaying the transformation results has been set, the transformation results will be displayed. After that, the processing moves to step S153 (FIG. 42) via a terminal I.

Figure 42:
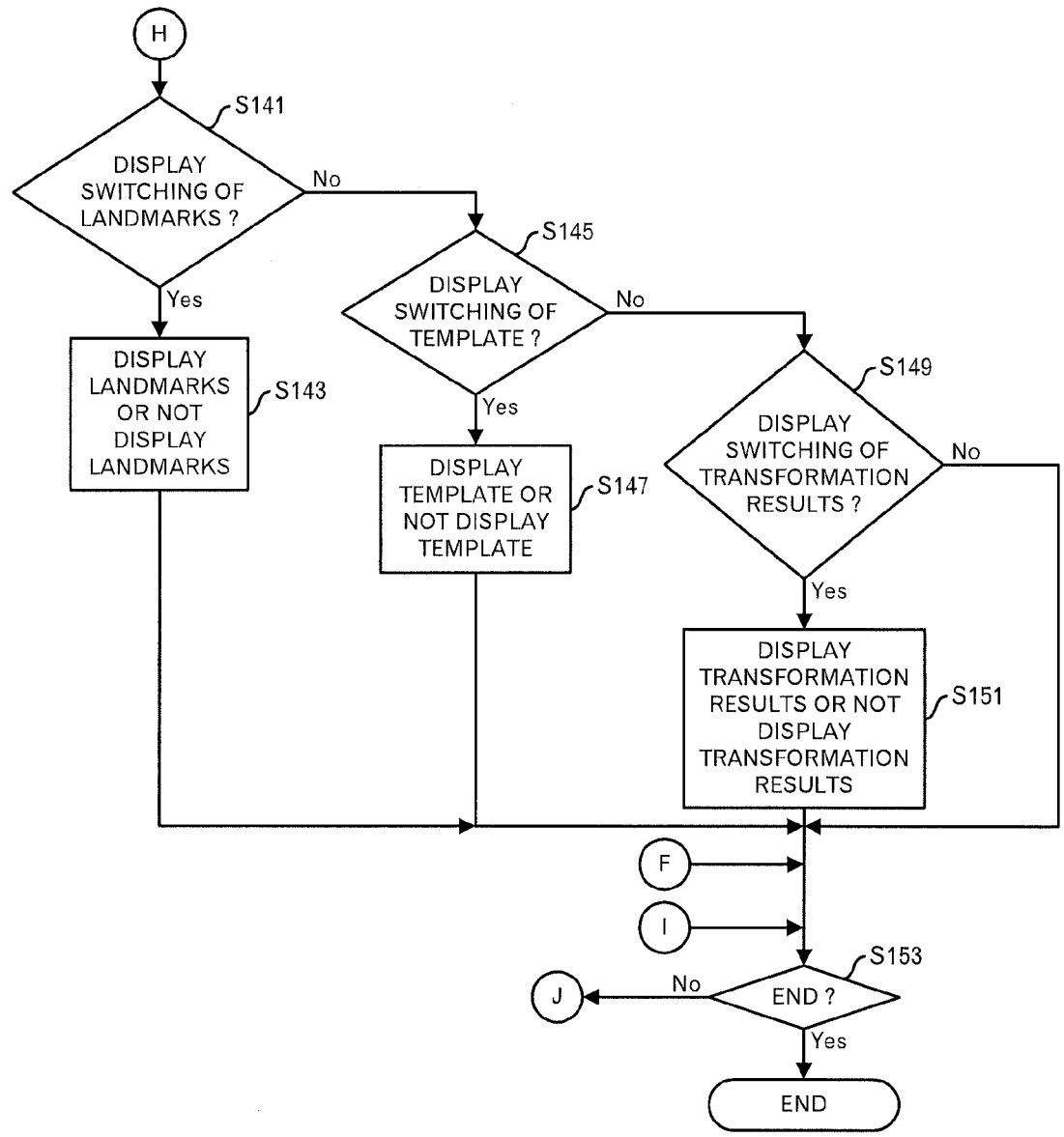
FIG. 42 is a diagram depicting a third portion of the second main processing flow of this embodiment.

Moving to explanation of FIG. 42, after the terminal H, the input unit 1 determines whether or not the received operation is display switching of the landmark (FIG. 42: step S141). When the received operation is display switching of the landmark (step S141: YES route), the input unit 1 causes the output unit 13 to switch between displaying and not displaying the landmark (step S143). When the button 3508 on the landmark setting screen is clicked and the landmark is displayed in the cross-section image display field 3504, the output unit 13 switches to a state where the landmark is not displayed. On the other hand, when the button 3508 is clicked and the landmark is not displayed in the cross-section image display field 3504, the output unit 13 switches to a state where the landmark is displayed. After that, the processing moves to the processing of the step S153.

On the other hand, when the received operation is not display switching of the landmark (step S141: NO route), the input unit 1 determines whether or not the received operation is display switching of the template (step S145). When the received operation is display switching of the template (step S145: YES route), the input unit 1 causes the output unit 13 to switch between displaying and not displaying the template (step S147). When the button 3510 on the landmark setting screen is clicked and template is displayed in the cross-section image display field 3504, the output unit 13 switches to a state where the template is not displayed. On the other hand, when the button 3510 is clicked and template is not displayed in the cross-section image display field 3504, the output unit 13 switches to a state where the template is displayed. After that, the processing moves to the processing of the step S153.

On the other hand, when the received operation is not display switching of the template (step S145: NO route), the input unit 1 determines whether or not the received operation is display switching of the transformation results (step S149). When the received operation is display switching of the transformation results (step S149: YES route), the input unit 1 causes the output unit 13 to switch between displaying and not displaying the transformation results (step S151). When the button 3511 on the landmark setting screen is clicked and transformation results are displayed in the cross-section image display field 3504, the output unit 13 switches to a state where the transformation results are not displayed. On the other hand, when the button 3511 is clicked and transformation results are not displayed in the cross-section image display field 3504, the output unit 13 switches to a state where the transformation results are displayed. After that, the processing shifts to a processing of step S153.

On the other hand, when the received operation is not display switching of the transformation results (step S149: NO route), the processing moves to the step S153.

Then, the input unit 1 determines whether or not the operation by the user has ended (step S153). For example, when the next operation has been performed (steps S153: NO route), the processing returns to the processing of the step S117 (FIG. 38) via a terminal J, and the processing described above is repeated.

On the other hand, when there is no next operation, or when the operation completion is instructed (step S153: YES route), this processing ends.

By carrying out the processing described above, it becomes possible to transform the shape of the details of the 3D geometric model according to user's instructions so as to match the 3D geometric model with the heart shape of tomographic images. When carrying out the transformation of the 3D template, accurate data cannot be obtained unless the 3-dimensional positions and angles of the tomographic images and the 3D template are associated each other. However, in this embodiment, because the positions and angles are roughly matches first, the transformation can be carried out with no problem.

In addition, at the step (4) illustrated in FIG. 14, only setting of the landmarks on the slice plane is required so as to match the positions of the boundaries of the respective parts in the 3D geometric model with those in the 3D volume data. Therefore, it is possible for even a user who is not a skilled physician to adjust the shape of the details of the 3D geometric model.

In this way, according to the method described above, it is possible to greatly reduce operation costs, and it is also possible to generate various 3D geometric models with little medical knowledge. Moreover, the generated 3D geometric model can be used as simulation input data, and can be used in educational presentations.

Although one embodiment of this technique was described above, this technique is not limited to this embodiment. For example, the functional block diagram of the 3D template transformation apparatus illustrated in FIG. 2 does not always correspond to an actual program module configuration. The data structures in the data storage units are mere examples. Moreover, the order of the steps in the processing flow may be exchanged as long as the processing results are not changed. Furthermore, the steps may be executed in parallel.

In addition, the screen example illustrated in FIG. 35 is a mere example, and another screen configuration to display the similar contents may be employed.

Figure 43:
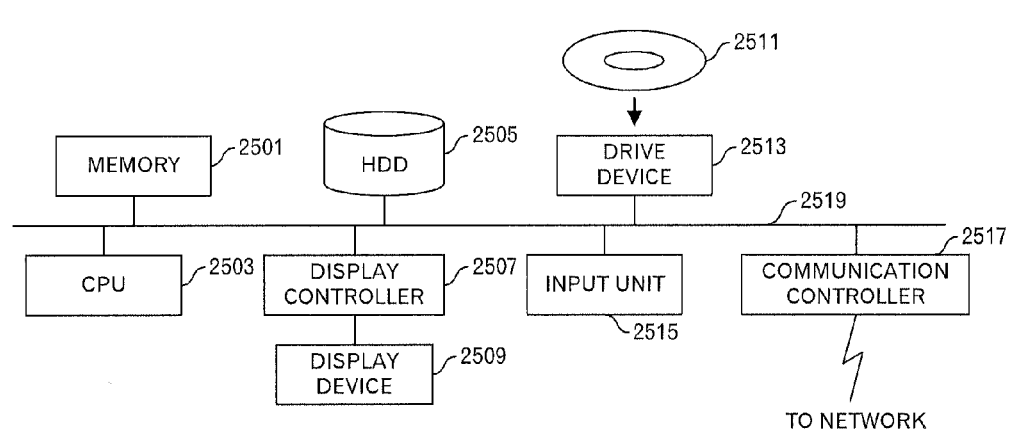
FIG. 43 is a functional block diagram of a computer.

In addition, the 3D template transformation apparatus is a computer device as shown in FIG. 43. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 43. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Figure 44:
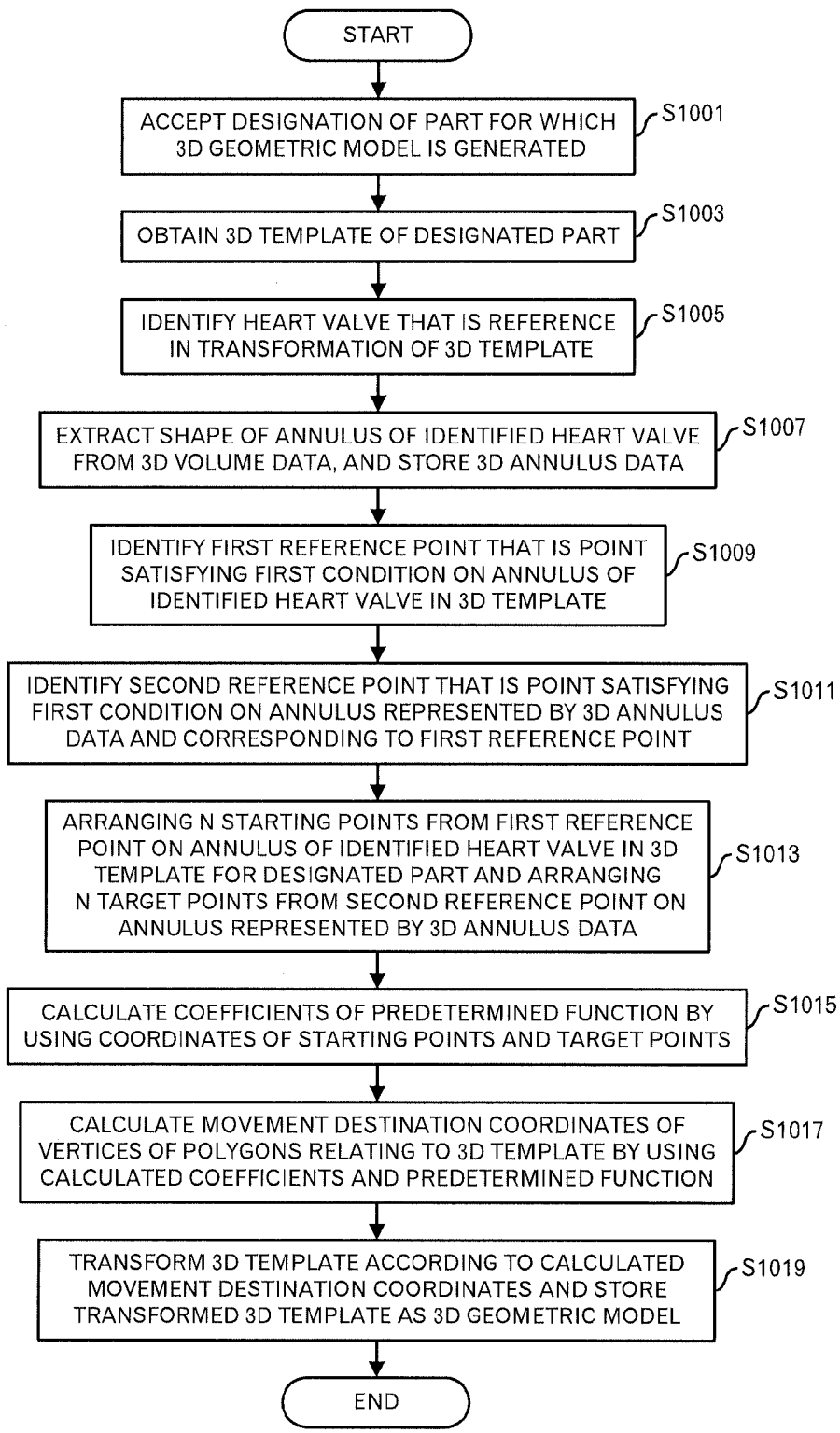
FIG. 44 is a diagram depicting a processing flow of the 3D template transformation method relating to a first aspect of this embodiment.

The aforementioned embodiments are outlined as follows:

A three-dimensional template transformation method relating to a first aspect of the embodiment, comprising: accepting (FIG. 44: S1001 and S1003) designation of a part for which a three-dimensional geometric model is generated, among a heart and blood vessels surrounding the heart to obtain a three-dimensional template for a designated part from a template storage unit storing three-dimensional templates represented by polygons; first identifying (FIG. 44: S1005) a heart valve that is a reference in transformation of the three-dimensional template for the designated part; extracting (FIG. 44: S1007) a shape of an annulus of the identified heart valve from a cross-section image in a plane passing through an axis within the annulus of the identified heart valve in a three-dimensional volume data, which is generated from a plurality of tomographic images of an organism including the heart, the plurality of tomographic images being stored in a tomographic image storage unit, and storing a three-dimensional annulus data representing the annulus of the identified heart valve into a storage device; second identifying (FIG. 44: S1009 and S1011) a first reference point that is a point satisfying a first condition on the annulus of the identified heart valve in the three-dimensional template for the designated part, and identifying a second reference point that is a point satisfying the first condition on the annulus represented by the three-dimensional annulus data stored in the storage device and corresponding to the first reference point; arranging (FIG. 44: S1013), according to a predetermined rule, n starting points from the first reference point on the annulus of the identified heart valve in the three-dimensional template for the designated part, arranging, according to the predetermined rule, n target points from the second reference point on the annulus represented by the three-dimensional annulus data stored in the storage device, and storing coordinates of the starting points and the target points into the storage device, wherein the n is a predetermined integer; first calculating (FIG. 44: S1015) coefficients of a predetermined function to calculate movement destination coordinates of vertices of the polygons relating to the three-dimensional template for the designated part, by using the coordinates of the starting points and the target points, which are stored in the storage device; and second calculating (FIG. 44: S1017 and S1019) the movement destination coordinates of the vertices of the polygons relating to the three-dimensional template for the designated part, by using the calculated coefficients and the predetermined function, transforming the three-dimensional template for the designated part according to the calculated movement destination coordinates, and storing the transformed three-dimensional template as a three-dimensional geometric model of the designated part into the storage device.

Thus, the heart valve relating to the identified part is used as a reference to carry out transformation of 3D template, and the 3D geometric model of the identified part is generated. Namely, because operations to draw the boundaries for the several hundred tomographic images become unnecessary, the 3D geometric model can be generated without works and with less medical knowledge. In addition, by using the heart valve, which is one of characteristics of the heart, as a reference, it becomes possible to generate the 3D geometric model close to the actual heart shape of the patient.

In addition, the first identifying may include: upon that the designated part includes a left ventricle, identifying a mitral valve and an aortic valve as references; upon that the designated part includes a right ventricle, identifying a tricuspid valve and a pulmonary valve as references; upon that the designated part includes a left atrium, identifying a mitral valve as a reference; upon that the designated part includes a right atrium, identifying a tricuspid valve as a reference; and upon that the designated part includes an aorta, identifying an aortic valve. Thus, because an appropriate heart valve is identified as a reference according to the identified part, 3D template can be transformed so as to be close to the actual heart shape.

The method relating to the first aspect of the technique may further include: upon accepting designation of a cross-section after the second calculating, transforming and storing, generating a first cross-section image in the designated cross-section from the three-dimensional volume data, generating a second cross-section image in the designated cross-section from the three-dimensional geometric model, and displaying a third cross-section image generated by superimposing the first cross-section image and the second cross-section image; and upon accepting inputs of the starting points and the target points on a display screen of the third cross-section image, storing coordinates of the inputted staring points and coordinates of the inputted target points into the storage device, and carrying out the first calculating and the second calculating, transforming and storing. Thus, it becomes possible to generate the 3D shape much closer to the actual heart shape.

The method relating to the first aspect of this technique may further include: detecting that the designated part includes a left ventricle; storing, as the coordinates of the starting point, coordinates of a heart apex in the three-dimensional template for the designated part into the storage device, before the first calculating; and before the first calculating, identifying a heart apex in the three-dimensional volume data, and storing, as the coordinates of the target point, coordinates of the identified heart apex into the storage device. Thus, by treating the heart apex as a reference instead of the heart valve, the position of the left ventricle after the transformation can be accurately grasped.

Furthermore, the method relating to the first aspect of this technique may further include: detecting that the designated part includes a left atrium; before the first calculating, generating a cross-section image of a particular boundary between the left atrium and a pulmonary vein from the three-dimensional volume data, and storing contour data concerning a contour of a part presumed as the pulmonary vein in the generated cross-section image into the storage device; before the first calculating, identifying a third reference point that is a point satisfying a second condition on a contour of the pulmonary vein in the particular boundary of the three-dimensional template for the designated part, and identifying a fourth reference point that is a point satisfying the second condition on a contour represented by the contour data stored in the storage device; and before the first calculating, arranging the starting points from the third reference point on the contour of the pulmonary vein in the particular boundary of the three-dimensional template for the designated part, according to the predetermined rule, arranging the target points from the fourth reference point on the contour represented by the contour data stored in the storage device, according to the predetermined rule, and storing coordinates of the starting points and the target points into the storage device. Thus, by treating the boundary between the left atrium and the pulmonary vein as a reference instead of the heart valve, the position of the left atrium after the transformation can be grasped much accurately.

In addition, the method relating to the first aspect of this technique may further include: detecting that the designated part includes an aorta; before the first calculating, generating, for each of a brachiocephalic artery, a left common carotid artery and a left subclavian artery, a cross-section image of a boundary with an aorta from the three-dimensional volume data, and storing second contour data concerning a contour of a part presumed as the brachiocephalic artery, the left common carotid artery or the left subclavian artery in the generated cross-section image into the storage device; before the first calculating, for each of the brachiocephalic artery, the left common carotid artery and the left subclavian artery, identifying a third reference point that is a point satisfying a second condition on a contour of the brachiocephalic artery, the left common carotid artery or the left subclavian artery in the boundary with the aorta in the three-dimensional template for the designated part, and identifying a fourth reference point that is a point satisfying the second condition on the contour represented by the second contour data stored in the storage device; and before the first calculating, for each of the brachiocephalic artery, the left common carotid artery and the left subclavian artery, arranging the starting points from the third reference point on the contour of the brachiocephalic artery, the left common carotid artery or the left subclavian artery in the boundary with the aorta in the three-dimensional template for the designated part, according to the predetermined rule, arranging the target points from the fourth reference point on the contour represented by the second contour data stored in the storage device, according to the predetermined rule, and storing coordinates of the starting points and the target points into the storage device. Thus, by treating the boundaries between the aorta and each of the brachiocephalic artery, the left common carotid artery and the left subclavian artery instead of the heart valve, the position of the aorta after the transformation can be grasped much accurately.

Furthermore, the aforementioned first condition may include a condition that the point is closest to a center of gravity of a triangle generated by connecting centers of respective annulus of a tricuspid valve, an aortic valve and a mitral valve. Thus, the valve annulus extracted from the 3D volume data can be associated with the valve annulus in the 3D template appropriately.

Moreover, the second condition may include a condition that the point is either of two points at which an ellipse corresponding to a blood vessel and a major axis or a minor axis of the blood vessel intersect. Thus, the contour of the blood vessel boundary extracted from the 3D volume data can be associated with the contour of the blood vessel boundary in the 3D template, appropriately.

Furthermore, the aforementioned predetermined rule may include a rule that the starting points or the target points are arranged at regular intervals.

Figure 45:
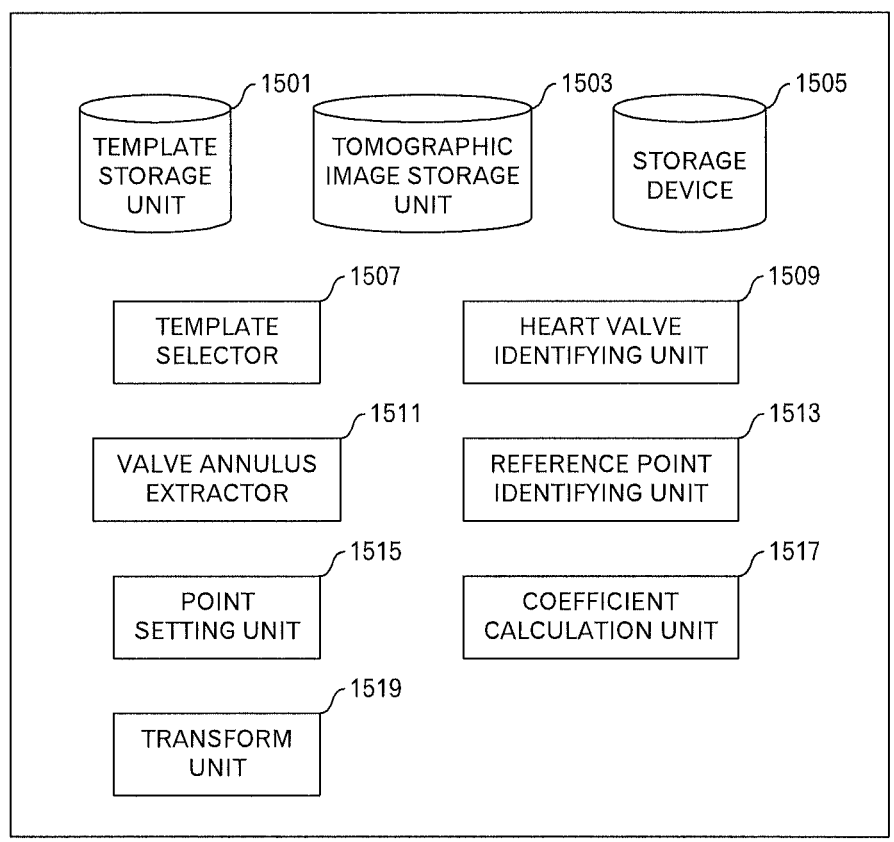
FIG. 45 is a functional block diagram of a 3D template transformation apparatus relating to a second aspect of this technique.

A three-dimensional template transformation apparatus relating to a second aspect of this technique includes: a template storage unit (FIG. 45: 1501) storing three-dimensional templates represented by polygons; a tomographic image storage unit (FIG. 45: 1503) storing a plurality of tomographic images; a template selector (FIG. 45: 1507) to accept designation of a part for which a three-dimensional geometric model is generated, among a heart and blood vessels surrounding the heart to obtain a three-dimensional template for a designated part from the template storage unit; a heart valve identifying unit (FIG. 45: 1509) to identify a heart valve that is a reference in transformation of the three-dimensional template for the designated part; a valve annulus extractor (FIG. 45: 1511) to extract a shape of an annulus of the identified heart valve from a cross-section image in a plane passing through an axis within the annulus of the identified heart valve in a three-dimensional volume data, which is generated from a plurality of tomographic images of an organism including the heart, and to store a three-dimensional annulus data representing the annulus of the identified heart valve into a storage device (FIG. 45: 1505); a reference point identifying unit (FIG. 45: 1513) to identifying a first reference point that is a point satisfying a first condition on the annulus of the identified heart valve in the three-dimensional template for the designated part, and to identify a second reference point that is a point satisfying the first condition on the annulus represented by the three-dimensional annulus data stored in the storage device and corresponding to the first reference point; a point setting unit (FIG. 45: 1515) to arrange, according to a predetermined rule, n starting points from the first reference point on the annulus of the identified heart valve in the three-dimensional template for the designated part, to arrange, according to the predetermined rule, n target points from the second reference point on the annulus represented by the three-dimensional annulus data stored in the storage device, and to store coordinates of the starting points and the target points into the storage device, wherein the n is a predetermined integer; a coefficient calculation unit (FIG. 45: 1517) to calculate coefficients of a predetermined function to calculate movement destination coordinates of vertices of the polygons relating to the three-dimensional template for the designated part, by using the coordinates of the starting points and the target points, which are stored in the storage device; and a transform unit (FIG. 45: 1519) to calculate the movement destination coordinates of the vertices of the polygons relating to the three-dimensional template for the designated part, by using the calculated coefficients and the predetermined function, to transform the three-dimensional template for the designated part according to the calculated movement destination coordinates, and to store the transformed three-dimensional template as a three-dimensional geometric model of the designated part into the storage device.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A three-dimensional template transformation method executed by a computer, comprising:
    accepting designation of apart for which a three-dimensional geometric model is generated, among a heart and blood vessels surrounding the heart to obtain a three-dimensional template for a designated part from a template storage unit storing three-dimensional templates represented by polygons;
    first identifying a heart valve that is a reference in transformation of the three-dimensional template for the designated part;
    extracting a shape of an annulus of the identified heart valve from a cross-section image in a plane passing through an axis within the annulus of the identified heart valve in a three-dimensional volume data, which is generated from a plurality of tomographic images of an organism including the heart, the plurality of tomographic images being stored in a tomographic image storage unit, and storing a three-dimensional annulus data representing the annulus of the identified heart valve into a storage device;
    second identifying a first reference point that is a point satisfying a first condition on the annulus of the identified heart valve in the three-dimensional template for the designated part, and identifying a second reference point that is a point satisfying the first condition on the annulus represented by the three-dimensional annulus data stored in the storage device and corresponding to the first reference point;
    arranging, according to a predetermined rule, n starting points from the first reference point on the annulus of the identified heart valve in the three-dimensional template for the designated part, arranging, according to the predetermined rule, n target points from the second reference point on the annulus represented by the three-dimensional annulus data stored in the storage device, and storing coordinates of the starting points and the target points into the storage device, wherein the n is a predetermined integer;
    first calculating coefficients of a predetermined function to calculate movement destination coordinates of vertices of the polygons relating to the three-dimensional template for the designated part, by using the coordinates of the starting points and the target points, which are stored in the storage device; and
    second calculating the movement destination coordinates of the vertices of the polygons relating to the three-dimensional template for the designated part, by using the calculated coefficients and the predetermined function, transforming the three-dimensional template for the designated part according to the calculated movement destination coordinates, and storing the transformed three-dimensional template as a three-dimensional geometric model of the designated part into the storage device.

2. The three-dimensional template transformation method as set forth in claim 1, wherein the first identifying comprises:
    upon that the designated part includes a left ventricle, identifying a mitral valve and an aortic valve as references;
    upon that the designated part includes a right ventricle, identifying a tricuspid valve and a pulmonary valve as references;
    upon that the designated part includes a left atrium, identifying a mitral valve as a reference;
    upon that the designated part includes a right atrium, identifying a tricuspid valve as a reference; and
    upon that the designated part includes an aorta, identifying an aortic valve.

3. The three-dimensional template transformation method as set forth in claim 1, further comprising:
    upon accepting designation of a cross-section after the second calculating, transforming and storing, generating a first cross-section image in the designated cross-section from the three-dimensional volume data, generating a second cross-section image in the designated cross-section from the three-dimensional geometric model, and displaying a third cross-section image generated by superimposing the first cross-section image and the second cross-section image; and upon accepting inputs of the starting points and the target points on a display screen of the third cross-section image, storing coordinates of the inputted staring points and coordinates of the inputted target points into the storage device, and carrying out the first calculating and the second calculating, transforming and storing.

4. The three-dimensional template transformation method as set forth in claim 1, further comprising:

detecting that the designated part includes a left ventricle;

storing, as the coordinates of the starting point, coordinates of a heart apex in the three-dimensional template for the designated part into the storage device, before the first calculating; and before the first calculating, identifying a heart apex in the three-dimensional volume data, and storing, as the coordinates of the target point, coordinates of the identified heart apex into the storage device.

5. The three-dimensional template transformation method as set forth in claim 1, further comprising:

detecting that the designated part includes a left atrium;

before the first calculating, generating a cross-section image of a particular boundary between the left atrium and a pulmonary vein from the three-dimensional volume data, and storing contour data concerning a contour of a part presumed as the pulmonary vein in the generated cross-section image into the storage device;

before the first calculating, identifying a third reference point that is a point satisfying a second condition on a contour of the pulmonary vein in the particular boundary of the three-dimensional template for the designated part, and identifying a fourth reference point that is a point satisfying the second condition on a contour represented by the contour data stored in the storage device; and before the first calculating, arranging the starting points from the third reference point on the contour of the pulmonary vein in the particular boundary of the three-dimensional template for the designated part, according to the predetermined rule, arranging the target points from the fourth reference point on the contour represented by the contour data stored in the storage device, according to the predetermined rule, and storing coordinates of the starting points and the target points into the storage device.

6. The three-dimensional template transformation method as set forth in claim 5, wherein the second condition includes a condition that the point is either of two points at which an ellipse corresponding to a blood vessel and a major axis or a minor axis of the blood vessel intersect.

7. The three-dimensional template transformation method as set forth in claim 1, further comprising:

detecting that the designated part includes an aorta;

before the first calculating, generating, for each of a brachiocephalic artery, a left common carotid artery and a left subclavian artery, across-section image of a boundary with an aorta from the three-dimensional volume data, and storing second contour data concerning a contour of a part presumed as the brachiocephalic artery, the left common carotid artery or the left subclavian artery in the generated cross-section image into the storage device;

before the first calculating, for each of the brachiocephalic artery, the left common carotid artery and the left subclavian artery, identifying a third reference point that is a point satisfying a second condition on a contour of the brachiocephalic artery, the left common carotid artery or the left subclavian artery in the boundary with the aorta in the three-dimensional template for the designated part, and identifying a fourth reference point that is a point satisfying the second condition on the contour represented by the second contour data stored in the storage device; and before the first calculating, for each of the brachiocephalic artery, the left common carotid artery and the left subclavian artery, arranging the starting points from the third reference point on the contour of the brachiocephalic artery, the left common carotid artery or the left subclavian artery in the boundary with the aorta in the three-dimensional template for the designated part, according to the predetermined rule, arranging the target points from the fourth reference point on the contour represented by the second contour data stored in the storage device, according to the predetermined rule, and storing coordinates of the starting points and the target points into the storage device.

8. The three-dimensional template transformation method as set forth in claim 1, wherein the first condition includes a condition that the point is closest to a center of gravity of a triangle generated by connecting centers of respective annulus of a tricuspid valve, an aortic valve and a mitral valve.

9. The three-dimensional template transformation method as set forth in claim 1, wherein the predetermined rule includes a rule that the starting points or the target points are arranged at regular intervals.

10. A computer-readable, non-transitory storage medium storing a program for causing a computer to execute a three-dimensional template transformation procedure, comprising:

accepting designation of apart for which a three-dimensional geometric model is generated, among a heart and blood vessels surrounding the heart to obtain a three-dimensional template for a designated part from a template storage unit storing three-dimensional templates represented by polygons;

first identifying a heart valve that is a reference in transformation of the three-dimensional template for the designated part;

extracting a shape of an annulus of the identified heart valve from a cross-section image in a plane passing through an axis within the annulus of the identified heart valve in a three-dimensional volume data, which is generated from a plurality of tomographic images of an organism including the heart, the plurality of tomographic images being stored in a tomographic image storage unit, and storing a three-dimensional annulus data representing the annulus of the identified heart valve into a storage device;

second identifying a first reference point that is a point satisfying a first condition on the annulus of the identified heart valve in the three-dimensional template for the designated part, and identifying a second reference point that is a point satisfying the first condition on the annulus represented by the three-dimensional annulus data stored in the storage device and corresponding to the first reference point;

arranging, according to a predetermined rule, n starting points from the first reference point on the annulus of the identified heart valve in the three-dimensional template for the designated part, arranging, according to the predetermined rule, n target points from the second reference point on the annulus represented by the three-dimensional annulus data stored in the storage device, and storing coordinates of the starting points and the target points into the storage device, wherein the n is a predetermined integer;

first calculating coefficients of a predetermined function to calculate movement destination coordinates of vertices of the polygons relating to the three-dimensional template for the designated part, by using the coordinates of the starting points and the target points, which are stored in the storage device; and second calculating the movement destination coordinates of the vertices of the polygons relating to the three-dimensional template for the designated part, by using the calculated coefficients and the predetermined function, transforming the three-dimensional template for the designated part according to the calculated movement destination coordinates, and storing the transformed three-dimensional template as a three-dimensional geometric model of the designated part into the storage device.

11. A three-dimensional template transformation apparatus, comprising:

a template storage unit storing three-dimensional templates represented by polygons;

a tomographic image storage unit storing a plurality of tomographic images;

a template selector to accept designation of a part for which a three-dimensional geometric model is generated, among a heart and blood vessels surrounding the heart to obtain a three-dimensional template for a designated part from the template storage unit;

a heart valve identifying unit to identify a heart valve that is a reference in transformation of the three-dimensional template for the designated part;

a valve annulus extractor to extract a shape of an annulus of the identified heart valve from a cross-section image in a plane passing through an axis within the annulus of the identified heart valve in a three-dimensional volume data, which is generated from a plurality of tomographic images of an organism including the heart, and to store a three-dimensional annulus data representing the annulus of the identified heart valve into a storage device;

a reference point identifying unit to identifying a first reference point that is a point satisfying a first condition on the annulus of the identified heart valve in the three-dimensional template for the designated part, and to identify a second reference point that is a point satisfying the first condition on the annulus represented by the three-dimensional annulus data stored in the storage device and corresponding to the first reference point;

a point setting unit to arrange, according to a predetermined rule, n starting points from the first reference point on the annulus of the identified heart valve in the three-dimensional template for the designated part, to arrange, according to the predetermined rule, n target points from the second reference point on the annulus represented by the three-dimensional annulus data stored in the storage device, and to store coordinates of the starting points and the target points into the storage device, wherein the n is a predetermined integer;

a coefficient calculation unit to calculate coefficients of a predetermined function to calculate movement destination coordinates of vertices of the polygons relating to the three-dimensional template for the designated part, by using the coordinates of the starting points and the target points, which are stored in the storage device; and a transform unit to calculate the movement destination coordinates of the vertices of the polygons relating to the three-dimensional template for the designated part, by using the calculated coefficients and the predetermined function, to transform the three-dimensional template for the designated part according to the calculated movement destination coordinates, and to store the transformed three-dimensional template as a three-dimensional geometric model of the designated part into the storage device.

* * * * *

UNITED STATES PATENT AND TRADEMARK OFFICE
CERTIFICATE OF CORRECTION

| | |
|---|---|
| PATENT NO. | : 8,594,405 B2 |
| APPLICATION NO. | : 13/052252 |
| DATED | : November 26, 2013 |
| INVENTOR(S) | : Machiko Nakagawa et al. |

It is certified that error appears in the above-identified patent and that said Letters Patent is hereby corrected as shown below:

In the Claims

In Column 23, Line 59, In Claim 1, delete "apart" and insert -- a part --, therefor.

Signed and Sealed this
First Day of April, 2014

Michelle K. Lee
*Deputy Director of the United States Patent and Trademark Office*